(12) United States Patent
Kim et al.

(10) Patent No.: US 11,983,374 B2
(45) Date of Patent: May 14, 2024

(54) TOUCH SENSOR, TOUCH SENSOR DRIVING METHOD, AND DISPLAY DEVICE

(71) Applicant: Samsung Display Co., Ltd., Yongin-Si (KR)

(72) Inventors: Hwa Jeong Kim, Yongin-si (KR); Jae Sic Lee, Yongin-si (KR); Na Yun Kwak, Yongin-si (KR); Dong Hwan Kim, Yongin-si (KR); Seung Woo Sung, Yongin-si (KR); Min Kyu Woo, Yongin-si (KR); Min Ku Lee, Yongin-si (KR); Seong Jun Lee, Yongin-si (KR); Sang Jin Pak, Yongin-si (KR); Sang Hyun Jun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/141,967

(22) Filed: May 1, 2023

(65) Prior Publication Data

US 2023/0266853 A1    Aug. 24, 2023

Related U.S. Application Data

(60) Continuation of application No. 17/491,404, filed on Sep. 30, 2021, now Pat. No. 11,675,466, which is a (Continued)

(30) Foreign Application Priority Data

Mar. 31, 2017    (KR) ........................ 10-2017-0041659

(51) Int. Cl.
*G09G 5/00*     (2006.01)
*G06F 3/041*    (2006.01)
*G06F 3/044*    (2006.01)

(52) U.S. Cl.
CPC .......... *G06F 3/0446* (2019.05); *G06F 3/0416* (2013.01); *G06F 3/04164* (2019.05); *G06F 3/04166* (2019.05); *G06F 3/044* (2013.01)

(58) Field of Classification Search
CPC .............. G06F 3/0446; G06F 3/04166; G06F 3/04164; G06F 3/0416; G06F 3/044; (Continued)

(56) References Cited

U.S. PATENT DOCUMENTS 6,034,968 A  *  3/2000  Park ................... H04L 65/1101
                                                        348/E7.083
7,057,589 B2     6/2006  Shin et al.
(Continued)

FOREIGN PATENT DOCUMENTS

KR    10-2003-0075946 A     9/2003
KR    10-2013-0136362 A    12/2013
(Continued)

*Primary Examiner* — Jennifer T Nguyen
(74) *Attorney, Agent, or Firm* — Innovation Counsel LLP

(57) ABSTRACT

A touch sensor may include a substrate and may include electrode units, first demultiplexers, second demultiplexers, and driving pads all located on the substrate. The electrode units each may include a plurality of electrode groups, the electrode groups each including a plurality of touch electrodes. The first demultiplexers each may include a plurality of sub-demultiplexers and each may be electrically connected to a corresponding one of the electrode units. Each of the sub-demultiplexers of a first demultiplexer may be electrically connected to a corresponding one of the electrode groups of a corresponding electrode unit. The second demultiplexers may be connected between the first demultiplexers and the driving pads.

18 Claims, 22 Drawing Sheets

Related U.S. Application Data continuation of application No. 16/915,946, filed on Jun. 29, 2020, now Pat. No. 11,163,412, which is a division of application No. 15/940,260, filed on Mar. 29, 2018, now Pat. No. 10,732,775.

(58) Field of Classification Search
CPC ..... G09G 2310/0297; G09G 2330/021; G09G 2300/08
USPC .......................................................... 345/174
See application file for complete search history.

(56) References Cited

U.S. PATENT DOCUMENTS

| | | | |
|---|---|---|---|
| 7,382,344 B2* | 6/2008 | Lee ...................... | G09G 3/3688 345/99 |
| 9,098,161 B2 | 8/2015 | Shin et al. | |
| 9,754,537 B2 | 9/2017 | Lee et al. | |
| 10,777,145 B2 | 9/2020 | Lee et al. | |
| 11,163,412 B2* | 11/2021 | Kim ...................... | G06F 3/0416 |
| 11,675,466 B2* | 6/2023 | Kim ...................... | G06F 3/0446 345/174 |
| 2009/0128545 A1 | 5/2009 | Lee et al. | |
| 2010/0302180 A1 | 12/2010 | Chang et al. | |
| 2011/0048812 A1 | 3/2011 | Yilmaz | |
| 2011/0181544 A1 | 7/2011 | Lee | |
| 2014/0009406 A1 | 1/2014 | Guard et al. | |
| 2015/0162388 A1 | 6/2015 | Kim | |
| 2016/0170531 A1 | 6/2016 | Lee | |
| 2016/0260367 A1 | 9/2016 | Kwak et al. | |
| 2017/0017325 A1* | 1/2017 | Tsai ...................... | G09G 3/2092 |
| 2017/0092171 A1* | 3/2017 | Knausz .................. | G06F 3/041 |
| 2018/0083078 A1* | 3/2018 | Park ...................... | H10K 59/1213 |
| 2018/0107338 A1 | 4/2018 | Chung | |
| 2019/0074328 A1 | 3/2019 | Park | |
| 2020/0357859 A1* | 11/2020 | An ........................ | G06F 3/044 |

FOREIGN PATENT DOCUMENTS

| | | |
|---|---|---|
| KR | 10-2014-0067406 A | 6/2014 |
| KR | 10-2014-0096329 A | 8/2014 |
| KR | 10-2015-0055707 A | 5/2015 |
| KR | 10-2015-0073042 A | 6/2015 |
| KR | 10-1619302 B1 | 5/2016 |
| KR | 10-2016-0080274 A | 7/2016 |
| KR | 10-2016-0108639 A | 9/2016 |
| KR | 10-2017-0023360 A | 3/2017 |

* cited by examiner

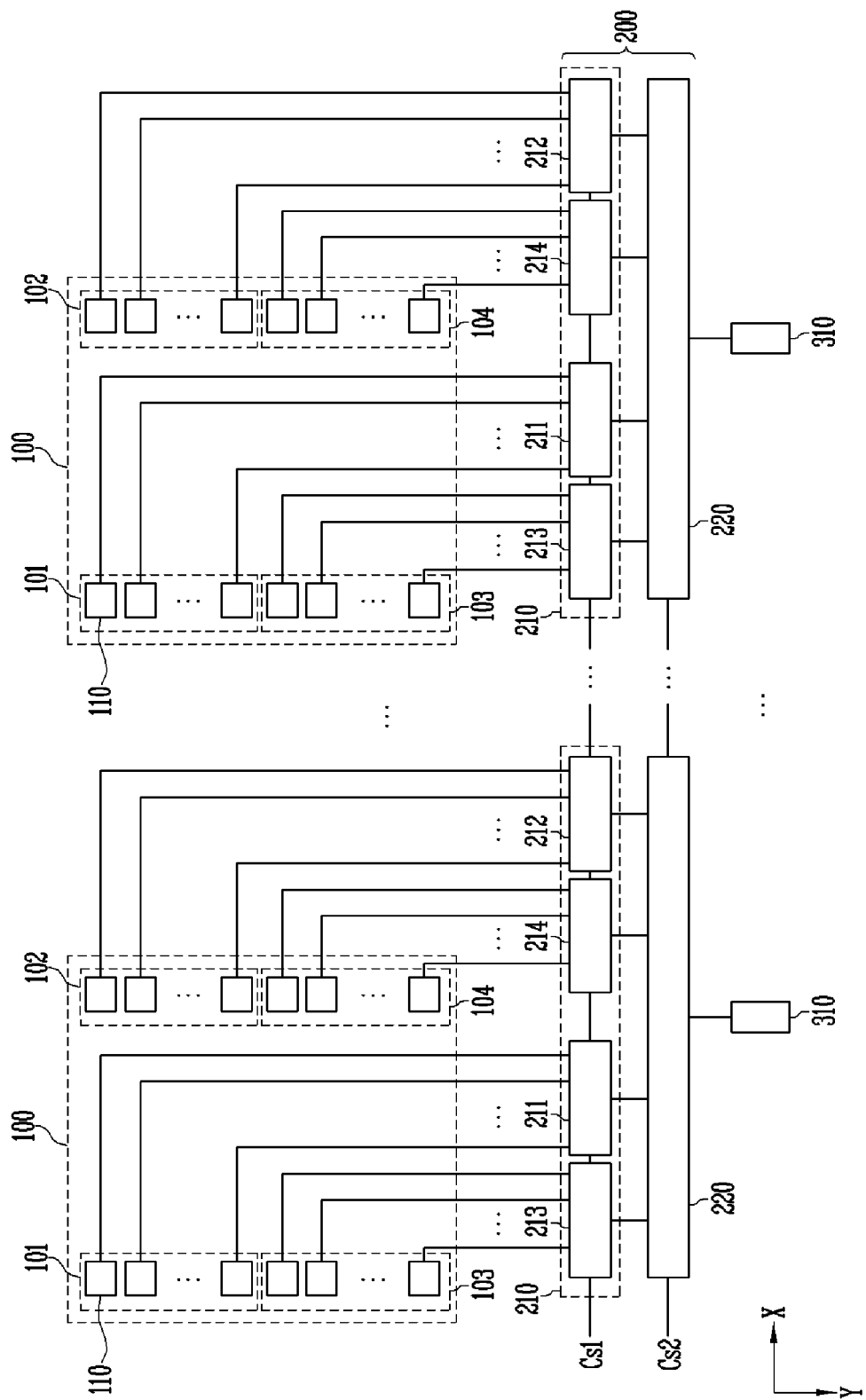

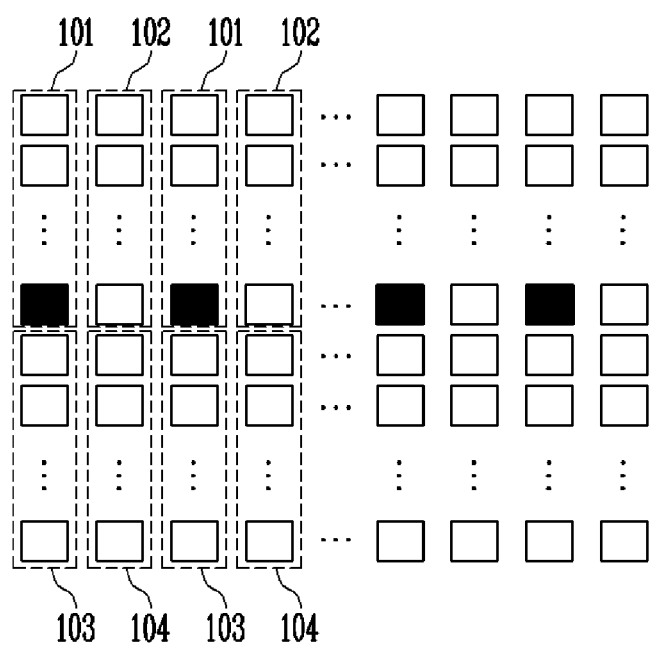

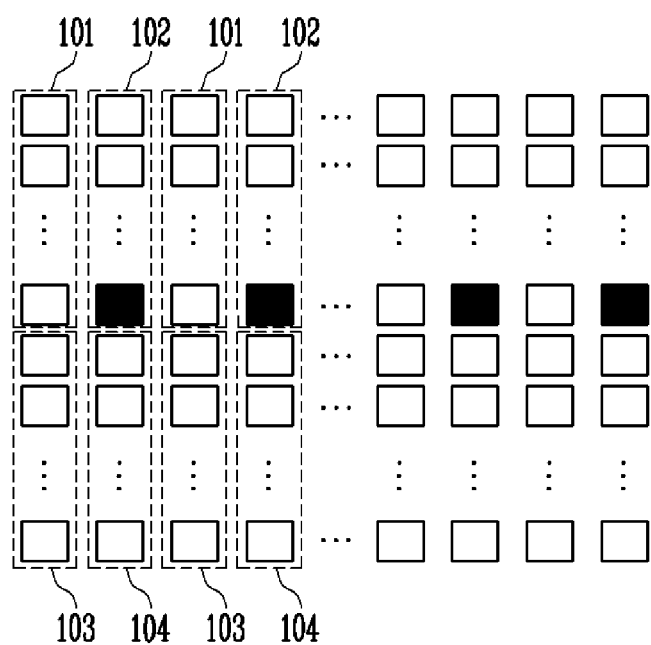

TOUCH SENSOR, TOUCH SENSOR DRIVING METHOD, AND DISPLAY DEVICE

CROSS-REFERENCE TO RELATED APPLICATION

This application is a continuation application of U.S. patent application Ser. No. 17/491,404 filed Sep. 30, 2021, which is a continuation application of U.S. patent application Ser. No. 16/915,946 filed Jun. 29, 2020 (now U.S. Pat. No. 11,163,412), which is a divisional application of U.S. patent application Ser. No. 15/940,260 filed Mar. 29, 2018 (now U.S. Pat. No. 10,732,775), which claims priority to Korean Patent Application No. 10-2017-0041659, filed on Mar. 31, 2017, in the Korean Intellectual Property Office; the entire disclosure of the Korean Patent Application is incorporated by reference herein.

BACKGROUND

1. Field

The technical field relates to a touch sensor, a driving method of the touch sensor, and a display device including the touch sensor.

2. Description of the Related Art

Display devices may include touch sensors for receiving touch inputs of users in addition to display unit for displaying images. Users can conveniently control the display devices through the touch sensors.

Various types of touch sensors are available. For example, a capacitive touch sensor senses a point at which capacitance is changed as a user's hand or object is in contact with the point, thereby detecting a touch position.

SUMMARY

Embodiments may minimize the number of pads in a touch sensor by using one or more demultiplexers.

An embodiment may be related to a touch sensor that includes the following elements: a substrate; electrode units located on the substrate, the electrode units each including a plurality of electrode groups; first demultiplexers located on the substrate, the first demultiplexers being respectively connected to the electrode units; driving pads located on the substrate; and second demultiplexers located on the substrate, the second demultiplexers being connected between the first demultiplexers and the driving pads, wherein each of the electrode groups includes a plurality of touch electrodes, wherein each of the first demultiplexers includes sub-demultiplexers connected to the electrode groups.

Each of the electrode units may include a first electrode group, a second electrode group, a third electrode group, and a fourth electrode group.

The first electrode group and the third electrode group may be disposed adjacent to each other along a first direction. The second electrode group and the fourth electrode group may be disposed adjacent to each other along the first direction.

The first electrode group and the second electrode group may be disposed adjacent to each other along a second direction intersecting the first direction. The third electrode group and the fourth electrode group may be disposed adjacent to each other along the second direction.

The first electrode group and the third electrode group may be disposed on an ith (i is a natural number of 1 or more) column. The second electrode group and the fourth electrode group may be disposed on an (i+1)th column.

Each of the first demultiplexers may include a first sub-demultiplexer connected to the first electrode group, a second sub-demultiplexer connected to the second electrode group, a third sub-demultiplexer connected to the third electrode group, and a fourth sub-demultiplexer connected to the fourth electrode group.

Each of the second demultiplexers may electrically connect a first sub-demultiplexer to a corresponding driving pad during a first period, electrically connect a second sub-demultiplexer to the driving pad during a second period, electrically connect a third sub-demultiplexer to the driving pad during a third period, and electrically connect a fourth sub-demultiplexer to the driving pad during a fourth period.

The first sub-demultiplexer may sequentially connect touch electrodes included in the first electrode group electrically to the driving pad during the first period, the second sub-demultiplexer may sequentially connect touch electrodes included in the second electrode group electrically to the driving pad during the second period, the third sub-demultiplexer may sequentially connect touch electrodes included in the third electrode group electrically to the driving pad during the third period, and the fourth sub-demultiplexer may sequentially connect touch electrodes included in the fourth electrode group electrically to the driving pad during the fourth period.

Operations of the first demultiplexers may be controlled by the same first control signals. Operations of the second demultiplexers may be controlled by the same second control signals.

The touch sensor may further include: first control pads located on the substrate, the first control pads providing the first control signals to the first demultiplexers; and second control pads located on the substrate, the second control pads providing the second control signals to the second demultiplexers.

The touch sensor may further include: a first voltage pad located on the substrate; and third demultiplexers connected between the electrode units and the first voltage pad.

Each of the third demultiplexers may include sub-demultiplexers respectively connected to different electrode groups.

The touch sensor may further include: a second voltage pad located on the substrate; and fourth demultiplexers connected between the electrode units and the second voltage pad.

Each of the fourth demultiplexers may include sub-demultiplexers respectively connected to different electrode groups.

The first voltage pad may provide a first voltage to the third demultiplexers, and the second voltage pad may provide a second voltage to the fourth demultiplexers. The first voltage may have a voltage value higher than the second voltage.

Operations of the third demultiplexers may be controlled by the same third control signals. Operations of the fourth demultiplexers may be controlled by the same fourth control signals.

The touch sensor may further include: third control pads located on the substrate, the third control pads providing the third control signals to the third demultiplexers; and fourth control pads located on the substrate, the fourth control pads providing the fourth control signals to the fourth demultiplexers.

The touch sensor may further include: a connecting member connected to the driving pads; and a touch driving unit supplying a driving signal to the driving pads through the connecting member.

An embodiment may be related to a method for driving a touch sensor. The method may include the following steps: sequentially supplying a driving signal to touch electrodes included in each first electrode group during a first period; sequentially supplying a driving signal to touch electrodes included in each second electrode group during a second period; sequentially supplying a driving signal to touch electrodes included in each third electrode group during a third period; and sequentially supplying a driving signal to touch electrodes included in each fourth electrode group during a fourth period, wherein the other touch electrodes except the touch electrodes supplied with the driving signal during each period are supplied with a first voltage or a second voltage.

The first electrode groups and the third electrode groups may be disposed along a first direction. The second electrode groups and the fourth electrode groups may be disposed along the first direction.

The first electrode groups and the second electrode groups may be alternately disposed along a second direction intersecting the first direction. The third electrode groups and the fourth electrode groups may be alternately disposed along the second direction.

The first electrode groups and the third electrode groups may be disposed on odd-numbered columns. The second electrode groups and the fourth electrode groups may be disposed on even-numbered columns.

During each period, some electrodes among the other electrodes may be supplied with the first voltage, and other some electrodes among the other electrodes may be supplied with the second voltage.

The first voltage may have a voltage value higher than the second voltage.

An embodiment may be related to a display device that includes the following elements: a substrate including a first region and a second region; pixels located on the first region; an encapsulation layer located on the pixels; electrode units located on the encapsulation layer, the electrode units each including a plurality of electrode groups; first demultiplexers located on the second region, the first demultiplexers being respectively connected to the electrode units; driving pads located on the second region; and second demultiplexers located on the second region, the second demultiplexers being connected between the first demultiplexers and the driving pads, wherein each of the electrode groups includes a plurality of touch electrodes, wherein each of the first demultiplexers includes sub-demultiplexers connected to the electrode groups.

The display device may further include a display driver located on the second region, the display driver driving the pixels.

Some of the first demultiplexers and some of the second demultiplexers may be located at one side of the display driver. Other some of the first demultiplexers and other some of the second demultiplexers may be located at the other side of the display driver.

The display device may further include: a connecting member connected to the driving pads; and a touch driving unit supplying a driving signal to the driving pads through the connecting member.

The display device may further include: a first voltage pad located on the second region; and third demultiplexers located on the second region, the third demultiplexers being connected between the electrode units and the first voltage pad.

The display device may further include: a second voltage pad located on the second region; and fourth demultiplexers located on the second region, the fourth demultiplexers being connected between the electrode units and the second voltage pad.

The first voltage pad may provide a first voltage to the third demultiplexers, and the second voltage pad may provide a second voltage to the fourth demultiplexers. The first voltage may have a voltage value higher than the second voltage.

An embodiment may be related to a touch sensor. The touch sensor may include a substrate and may include electrode units, first demultiplexers, second demultiplexers, and driving pads all located on the substrate. The electrode units each may include a plurality of electrode groups, the electrode groups each including a plurality of touch electrodes. The first demultiplexers each may include a plurality of sub-demultiplexers and each may be electrically connected to a corresponding one of the electrode units. Each of the sub-demultiplexers of a first demultiplexer may be electrically connected to a corresponding one of the electrode groups of a corresponding electrode unit. The second demultiplexers may be connected between the first demultiplexers and the driving pads. The driving pads may be electrically connected through the second demultiplexers to the first demultiplexers.

Each of the electrode units may include a first electrode group, a second electrode group, a third electrode group, and a fourth electrode group.

The first electrode group and the third electrode group may be disposed adjacent to each other along a first direction, and The second electrode group and the fourth electrode group may be disposed adjacent to each other along the first direction.

The first electrode group and the second electrode group may be disposed adjacent to each other along a second direction different from the first direction. The third electrode group and the fourth electrode group may be disposed adjacent to each other along the second direction.

The first electrode group and the third electrode group may be disposed on a first column. The second electrode group and the fourth electrode group may be disposed on a second column parallel to the first column.

Each of the first demultiplexers may include a first sub-demultiplexer electrically connected to the first electrode group, a second sub-demultiplexer electrically connected to the second electrode group, a third sub-demultiplexer electrically connected to the third electrode group, and a fourth sub-demultiplexer electrically connected to the fourth electrode group.

Each of the second demultiplexers may electrically connect the first sub-demultiplexer to a corresponding driving pad during a first period, electrically connects the second sub-demultiplexer to the corresponding driving pad during a second period, electrically connects the third sub-demultiplexer to the corresponding driving pad during a third period, and electrically connects the fourth sub-demultiplexer to the corresponding driving pad during a fourth period.

The first sub-demultiplexer may sequentially connect touch electrodes included in the first electrode group electrically to the corresponding driving pad during the first period. The second sub-demultiplexer may sequentially connect touch electrodes included in the second electrode group electrically to the corresponding driving pad during the second period. The third sub-demultiplexer may sequentially connect touch electrodes included in the third electrode group electrically to the corresponding driving pad during the third period. The fourth sub-demultiplexer may sequentially connect touch electrodes included in the fourth electrode group electrically to the corresponding driving pad during the fourth period.

Operations of the first demultiplexers may be controlled by same first control signals. Operations of the second demultiplexers may be controlled by same second control signals.

The touch sensor may include the following elements: first control pads located on the substrate for providing the first control signals to the first demultiplexers; and second control pads located on the substrate for providing the second control signals to the second demultiplexers.

The touch sensor may include the following elements: a first voltage pad located on the substrate; and third demultiplexers connected between the electrode units and the first voltage pad. The electrode units may be electrically connected through the third multiplexers to the first voltage pad.

Each of the third demultiplexers may include sub-demultiplexers respectively electrically connected to different electrode groups.

The touch sensor may include the following elements: a second voltage pad located on the substrate; and fourth demultiplexers connected between the electrode units and the second voltage pad. The electrode units may be electrically connected through the fourth demultiplexers to the second voltage pad.

Each of the fourth demultiplexers may include sub-demultiplexers respectively electrically connected to different electrode groups.

The first voltage pad may provide a first voltage to the third demultiplexers. The second voltage pad may provide a second voltage to the fourth demultiplexers. A voltage value of the first voltage may be higher than a voltage value of the second voltage.

Operations of the third demultiplexers may be controlled by same third control signals. Operations of the fourth demultiplexers may be controlled by same fourth control signals.

The touch sensor may include the following elements: third control pads located on the substrate for providing the third control signals to the third demultiplexers; and fourth control pads located on the substrate for providing the fourth control signals to the fourth demultiplexers.

The touch sensor may include the following elements: a connecting member electrically connected to the driving pads; and a touch driving unit for supplying a driving signal to the driving pads through the connecting member.

An embodiment may be related to a method for driving a touch sensor. The method may include the following steps: sequentially supplying a driving signal to touch electrodes included in first electrode groups during a first period; subsequently, sequentially supplying the driving signal to touch electrodes included in second electrode groups during a second period; subsequently, sequentially supplying the driving signal to touch electrodes included in third electrode groups during a third period; and subsequently, sequentially supplying the driving signal to touch electrodes included in fourth electrode groups during a fourth period. All touch electrodes in all of the first electrode groups, the second electrode groups, the third electrode groups, and the fourth electrode groups except touch electrodes being currently supplied with the driving signal may be supplied with at least one of a first voltage and a second voltage.

The first electrode groups and the third electrode groups may i be disposed along a first direction.

The second electrode groups and the fourth electrode groups may be disposed along the first direction.

The first electrode groups and the second electrode groups may be alternately disposed along a second direction different from the first direction. The third electrode groups and the fourth electrode groups may be alternately disposed along the second direction.

The first electrode groups and the third electrode groups may be disposed in odd-numbered columns. The second electrode groups and the fourth electrode groups may be disposed in even-numbered columns.

During each period, some electrodes not being currently supplied with the driving signal may be supplied with the first voltage, and other electrodes not being currently supplied with the driving signal may be supplied with the second voltage.

A voltage value of the first voltage may be higher than a voltage value of the second voltage.

An embodiment may be related to a display device. The display device may include the following elements: a substrate including a first region and a second region; pixels located on the first region; an encapsulation layer covering the pixels; electrode units located on the encapsulation layer and each including a plurality of electrode groups, the electrode groups each including a plurality of touch electrodes; first demultiplexers located on the second region, each including a plurality of sub-demultiplexers, and each being electrically connected to a corresponding one of the electrode units, each of the sub-demultiplexers of a first demultiplexer being electrically connected to a corresponding one of the electrode groups of a corresponding electrode unit; driving pads located on the second region; and second demultiplexers located on the second region and connected between the first demultiplexers and the driving pads. The driving pads may be electrically connected through the second demultiplexers to the first demultiplexers.

The display device may include a display driver located on the second region for driving the pixels.

The display driver may be located between a first demultiplexer subset of the first demultiplexers and a second demultiplexer subset of the first demultiplexers. The display driver may be located between a first demultiplexer subset of the second demultiplexers and a second demultiplexer subset of the second demultiplexers.

The display device may include the following elements: a connecting member electrically connected to the driving pads; and a touch driving unit for supplying a driving signal to the driving pads through the connecting member.

The display device may include the following elements: a first voltage pad located on the second region; and third demultiplexers located on the second region and connected between the electrode units and the first voltage pad. The electrode units may be electrically connected through the third demultiplexers to the first voltage pad.

The display device may include the following elements: a second voltage pad located on the second region; and fourth demultiplexers located on the second region and connected between the electrode units and the second voltage pad. The electrode units may be electrically connected through the fourth demultiplexers to the second voltage pad.

The first voltage pad may provide a first voltage to the third demultiplexers. The second voltage pad may provide a second voltage to the fourth demultiplexers. A voltage value of the first voltage may be higher than a voltage value higher of second voltage.

BRIEF DESCRIPTION OF THE DRAWINGS

FIG. 2 is a view (e.g., plan view) illustrating electrode units and demultiplexers according to an embodiment.

FIG. 5A, FIG. 5B, FIG. 5C, FIG. 6A, FIG. 6B, FIG. 6C, FIG. 7A, FIG. 7B, FIG. 7C, FIG. 8A, FIG. 8B, and FIG. 8C are views (e.g., plan views) illustrating activated touch electrodes for different driving periods.

DETAILED DESCRIPTION

Figure 1A:
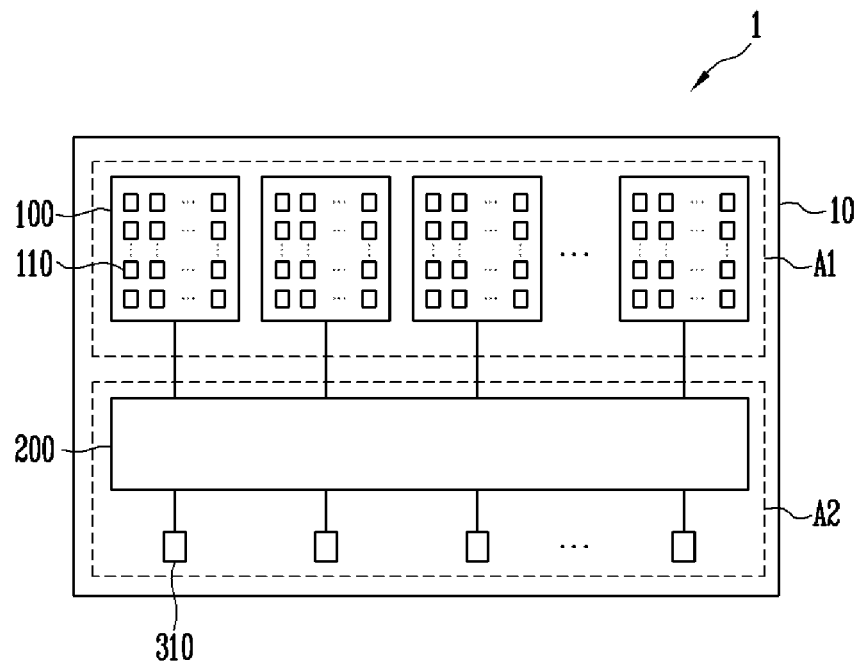
FIG. 1A is a view (e.g. plan view) illustrating a touch sensor according to an embodiment.

Example embodiments are described in conjunction with the accompanying drawings. The embodiments may be implemented into different forms. These embodiments are provided for illustrative purposes.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the specification, when an element is referred to as being "connected" or "coupled" to another element, it can be directly connected or coupled to the another element or be indirectly connected or coupled (e.g., electrically connected) to the another element through one or more intervening elements. A "signal" may mean one or more copies of the signal. Like reference numerals may refer to like elements.

Figure 1B:
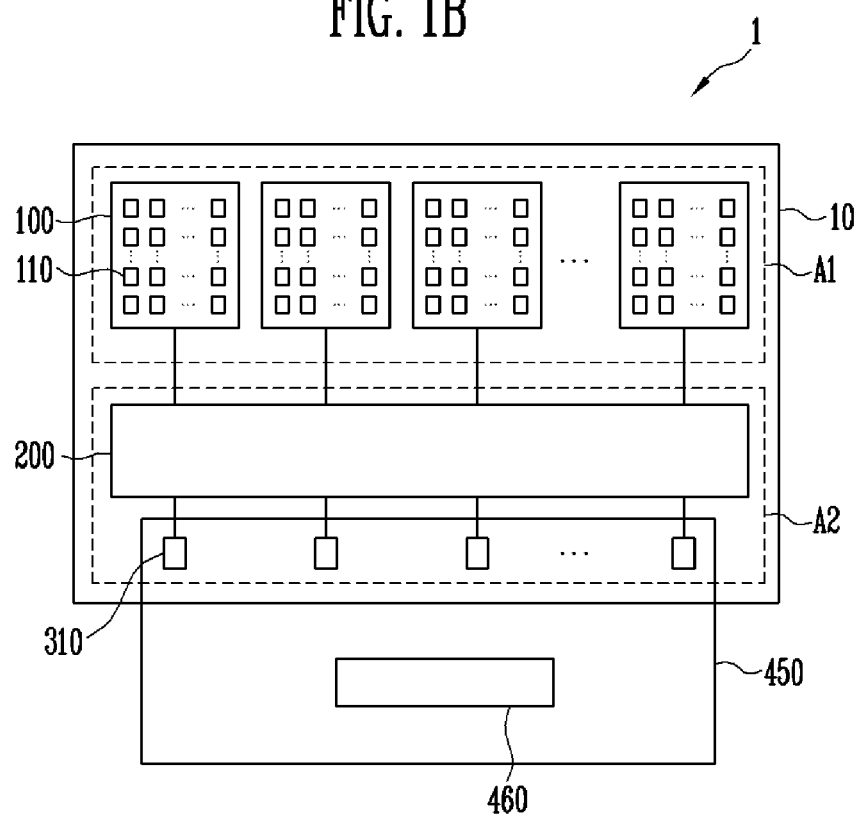
FIG. 1B is a view illustrating a touch sensor with a touch driving unit according to an embodiment.

FIG. 1A is a view illustrating a touch sensor 1 according to an embodiment, and FIG. 1B is a view illustrating a touch sensor including a touch driving unit according to an embodiment.

Referring to FIG. 1A, the touch sensor 1 may include a substrate 10, electrode units 100, a demultiplexer 200, and driving pads 310.

The substrate 10 may include a first region A1 and a second region A2. The first region A1 is a region in which the electrode units 100 are located, and may be referred to as a touch active region.

In an embodiment, the remaining region located at the periphery of the first region A1 may be referred to as a touch non-active region, and the second region A2 may be defined as at least a partial region of the touch non-active region.

The second region A2 is a region in which the demultiplexer 200 and the driving pads 310 are located, and may be located at one side of the first region A1.

The substrate 10 may be made of an insulative/insulating material such as glass or resin. In an embodiment, the substrate 10 may be made of a material having flexibility to be bendable or foldable. The substrate 10 may have a single- or multi-layered structure.

For example, the substrate 10 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, and polyurethane.

In an embodiment, the substrate 10 may be made of fiber glass reinforced plastic (FRP), or the like.

The electrode units 100 may be located on the first region A1 of the substrate 10, and each of the electrode units 100 may include a plurality of touch electrodes 110.

The touch electrodes 110 may be activated through driving signals supplied from the demultiplexer 200.

In addition, the touch electrodes 110 may include a conductive material. For example, the conductive material may include a metal or an alloy. Examples of the metal may include gold (Au), silver (Ag), aluminum (Al), molybdenum (Mo), chromium (Cr), titanium (Ti), nickel (Ni), neodymium (Nd), copper (Cu), platinum (Pt), and the like.

In an embodiment, the touch electrodes 110 may be made of a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like. The touch electrodes 110 may have a single- or multi-layered structure.

The demultiplexer 200 may be located on the second region A2 of the substrate 10. In an embodiment, the demultiplexer 200 may selectively connect the touch electrodes 110 electrically to the driving pads 310.

Accordingly, the demultiplexer 200 can time-divisionally supply driving signals applied through the driving pads 310 to the touch electrodes 110.

The driving pads 310 may be located on the second region A2 of the substrate 10. In an embodiment, the driving pads 310 may receive driving signals supplied from an external source.

For example, driving signals may be supplied to the driving pads through a separate driving device (not shown) in a test process before product shipment.

In a typical touch sensor, the number of driving pads may need to be equal to the number of touch electrodes in order to supply driving signals to all the touch electrodes. In contrast, in an embodiment, the demultiplexer 200 is provided, so that the number of driving pads 310 can be significantly less than the touch electrodes. Accordingly, the total area of dead spaces (i.e., areas not used for displaying images or receiving touches) can be effectively minimized.

Referring to FIG. 1B, the touch sensor 1 may include a connecting member 450 and a touch driving unit 460.

The connecting member 450 may be attached to and/or electrically connected to the driving pads 310, and the touch driving unit 460 may supply driving signals to the driving pads 310 through the connecting member 450. In an embodiment, the touch driving unit 460 may be mounted on the connecting member 450.

In an embodiment, the touch sensor 1 may be driven using a separate driving device (not shown) in a test process before product shipment, and the touch driving unit 460 may be additionally installed after the test process to drive the touch sensor 1.

In an embodiment, the connecting member 450 may be implemented as a flexible printed circuit board (FPCB), and the touch driving unit 460 may be implemented as an integrated circuit (IC).

The above-described touch electrodes 110 may be spaced apart from each other. The touch electrodes 110 may output, to the touch driving unit 460, one or more sensing signals indicating a change in capacitance.

For example, the touch driving unit 460 may receive a sensing signal output from the touch electrodes 110 through the demultiplexer 200 and the driving pads 310.

When a touch is applied to the touch sensor 1, the self-capacitance of touch electrodes 110 related to the touch is changed. Thus, the touch driving unit 460 can detect a touch position using a sensing signal output from the touch electrodes 110.

FIG. 2 is a view illustrating electrode units and demultiplexers according to an embodiment.

Referring to FIG. 2, each of the electrode units 100 may include a plurality of electrode groups.

For example, each of the electrode units 100 may include a first electrode group 101, a second electrode group 102, a third electrode group 103, and a fourth electrode group 104.

The electrode groups 101, 102, 103, and 104 may each include a plurality of touch electrodes 110.

In an embodiment, the first electrode group 101 and the third electrode group 103 may be disposed immediately adjacent to each other along a first direction (e.g., a Y-axis direction), and the second electrode group 102 and the fourth electrode group 104 may be disposed immediately adjacent to each other along the first direction.

In an embodiment, the first electrode group 101 and the second electrode group 102 may be disposed adjacent to each other along a second direction (e.g., an X-axis direction) different from the first direction, and the third electrode group 103 and the fourth electrode group 104 may be disposed adjacent to each other along the second direction.

In an embodiment, the first electrode group 101 and the third electrode group 103 may be disposed in an ith (i is a natural number of 1 or more) column, and the second electrode group 102 and the fourth electrode group 104 may be disposed in an (i+1)th column.

In an embodiment, a plurality of first electrode groups 101 and a plurality of third electrode groups 103 may be disposed in odd-numbered columns, and a plurality of second electrode groups 102 and a plurality of fourth electrode groups 104 may be disposed in even-numbered columns.

In an embodiment, the demultiplexer 200 may include a plurality of first demultiplexers 210 and a plurality of second demultiplexers 220.

The first demultiplexers 210 may be connected to the electrode units 100, respectively. In an embodiment, the first demultiplexers 210 may each include a plurality of sub-demultiplexers 211, 212, 213, and 214 respectively electrically connected to the electrode groups 101, 102, 103, and 104 of a corresponding electrode unit 100.

For example, a demultiplexer 210 may include a first sub-demultiplexer 211, a second sub-demultiplexer 212, a third sub-demultiplexer 213, and a fourth sub-demultiplexer 214.

The first sub-demultiplexer 211 may be connected between a corresponding first electrode group 101 and a corresponding second demultiplexer 220. In an embodiment, the first sub-demultiplexer 211 may selectively connect touch electrodes 110 of the corresponding first electrode group 101 electrically to the corresponding second demultiplexer 220.

The second sub-demultiplexer 212 may be connected between a corresponding second electrode group 102 and the corresponding second demultiplexer 220. In an embodiment, the second sub-demultiplexer 212 may selectively connect touch electrodes 110 of the corresponding second electrode group 102 electrically to the corresponding second demultiplexer 220.

The third sub-demultiplexer 213 may be connected between a corresponding third electrode group 103 and the corresponding second demultiplexer 220. In an embodiment, the third sub-demultiplexer 213 may selectively connect touch electrodes 110 of the corresponding third electrode group 103 electrically to the corresponding second demultiplexer 220.

The fourth sub-demultiplexer 214 may be connected between a corresponding fourth electrode group 104 and the corresponding second demultiplexer 220. In an embodiment, the fourth sub-demultiplexer 214 may selectively connect touch electrodes 110 of the corresponding fourth electrode group 104 electrically to the corresponding second demultiplexer 220.

The second demultiplexers 220 may be connected between the first demultiplexers 210 and driving pads 310.

A second demultiplexer 220 may selectively connect the sub-demultiplexers 211, 212, 213, and 214 of a corresponding first demultiplexer 210 electrically to a corresponding driving pad 310.

For example, each of the second demultiplexers 220 may electrically connect a corresponding first sub-demultiplexer 211 to a corresponding driving pad 310 during a first period, (subsequently) electrically connect a corresponding second sub-demultiplexer 212 to the driving pad 310 during a second period, (subsequently) electrically connect a corresponding third sub-demultiplexer 213 to the driving pad 310 during a third period, and (subsequently) electrically connect a corresponding fourth sub-demultiplexer 214 to the driving pad 310 during a fourth period.

In an embodiment, each of the first sub-demultiplexers 211 may sequentially connect the touch electrodes 110 included in the corresponding first electrode group 101 electrically to the driving pad 310 during the first period, and (subsequently) each of the second sub-demultiplexers 212 may sequentially connect the touch electrodes 110 included in the corresponding second electrode group 102 electrically to the driving pad 310 during the second period.

In an embodiment, (subsequently) each of the third sub-demultiplexers 213 may sequentially connect the touch electrodes 110 included in the corresponding third electrode group 103 electrically to the driving pad 310 during the third period, and (subsequently) each of the fourth sub-demultiplexers 214 may sequentially connect the touch electrodes 110 included in the corresponding fourth electrode group 104 electrically to the driving pad 310 during the fourth period.

In an embodiment, operations of the first demultiplexers 210 may be controlled by (copies of) the same first control signal(s) Cs1, and operations of the second demultiplexers 220 may be controlled by (copies of) the same second control signal(s) Cs2.

Figure 3:
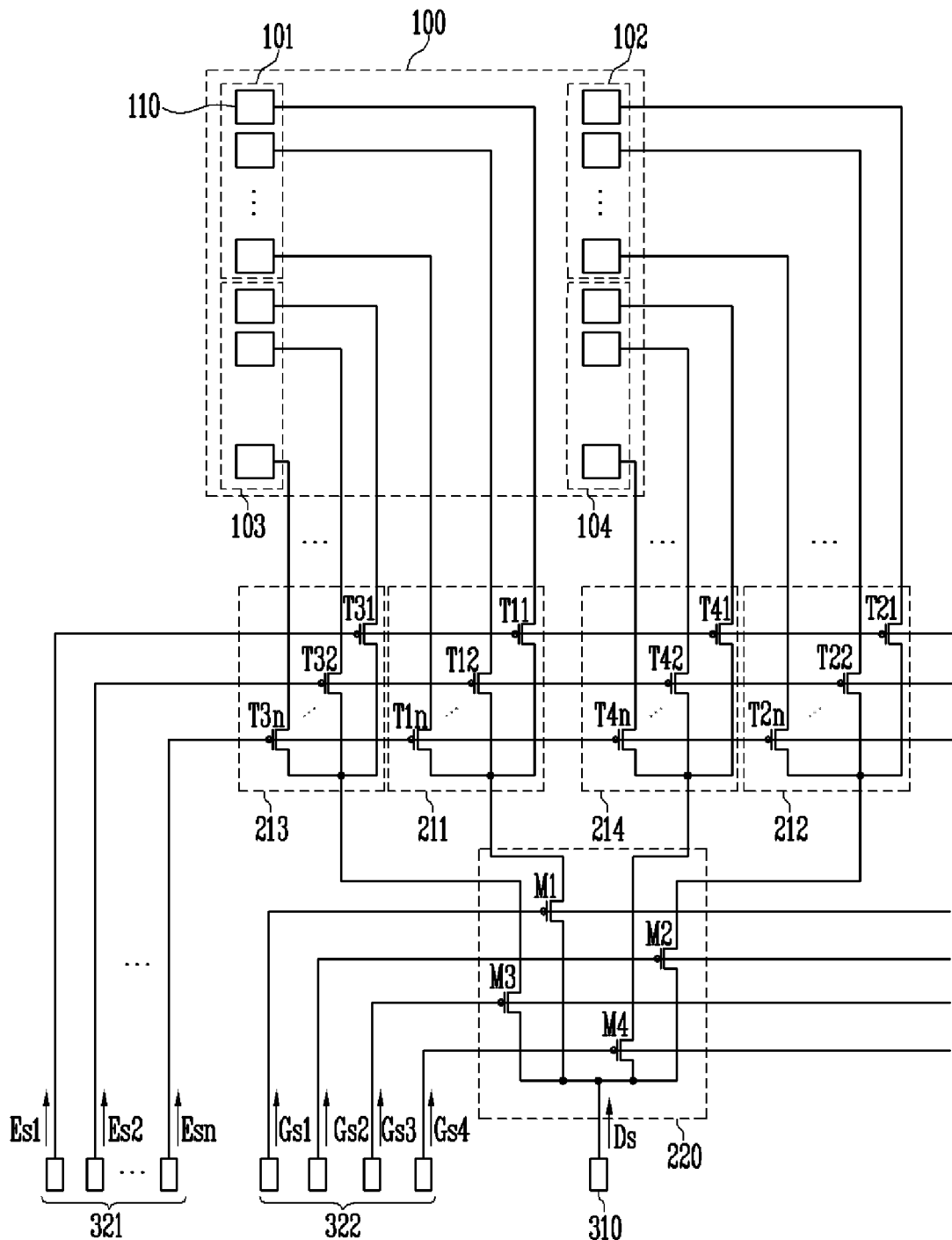
FIG. 3 is a view illustrating a circuit configuration of a first demultiplexer and a second demultiplexer according to an embodiment.

FIG. 3 is a view illustrating a circuit configuration of a first demultiplexer and a second demultiplexer according to an embodiment. An electrode unit 100, a first demultiplexer 210, and a second demultiplexer 220, which are related to one driving pad 310, are illustrated in FIG. 3.

Referring to FIG. 3, a first sub-demultiplexer 211 may include a plurality of transistors T11, T12, to T1n.

The transistors T11 to T1n may be connected between touch electrodes 110 of a first electrode group 101 and the second demultiplexer 220.

The transistors T11 to T1n may be provided in the same number as the touch electrodes 110 included in the first electrode group 101. In an embodiment, n transistors T11 to T1n may be connected one-to-one to n touch electrodes 110 included in the first electrode group 101, wherein n is a natural number.

For example, first electrodes of the transistors T11 to T1n may be connected to the touch electrodes 110 of the first electrode group 101, respectively, and second electrodes of the transistors T11 to T1n may be commonly connected to a first transistor M1 of the second demultiplexer 220.

In an embodiment, gate electrodes of the transistors T11 to T1n may be connected to first control pads 321, respectively.

Accordingly, the transistors T11 to T1n can be turned on corresponding to electrode selection signals Es1, Es2, to Esn supplied from the first control pads 321.

A second sub-demultiplexer 212 may include a plurality of transistors T21, T22, to T2n.

The transistors T21 to T2n may be connected between touch electrodes 110 of a second electrode group 102 and the second demultiplexer 220.

The transistors T21 to T2n may be provided in the same number as the touch electrodes 110 included in the second electrode group 102. In an embodiment, n transistors T21 to T2n may be connected one-to-one to n touch electrodes 110 included in the second electrode group 102.

For example, first electrodes of the transistors T21 to T2n may be connected to the touch electrodes 110 of the second electrode group 102, respectively, and second electrodes of the transistors T21 to T2n may be commonly connected to a second transistor M2 of the second demultiplexer 220.

In an embodiment, gate electrodes of the transistors T21 to T2n may be connected to the first control pads 321, respectively.

Accordingly, the transistors T21 to T2n can be turned on corresponding to the electrode selection signals Es1 to Esn supplied from the first control pads 321.

A third sub-demultiplexer 213 may include a plurality of transistors T31, T32, to T3n.

The transistors T31 to T3n may be connected between touch electrodes 110 of a third electrode group 103 and the second demultiplexer 220.

The transistors T31 to T3n may be provided in the same number as the touch electrodes 110 included in the third electrode group 103. In an embodiment, n transistors T31 to T3n may be connected one-to-one to n touch electrodes 110 included in the third electrode group 103.

For example, first electrodes of the transistors T31 to T3n may be connected to the touch electrodes 110 of the third electrode group 103, respectively, and second electrodes of the transistors T31 to T3n may be commonly connected to a third transistor M3 of the second demultiplexer 220.

In an embodiment, gate electrodes of the transistors T31 to T3n may be connected to the first control pads 321, respectively.

Accordingly, the transistors T31 to T3n can be turned on corresponding to the electrode selection signals Es1 to Esn supplied from the first control pads 321.

A fourth sub-demultiplexer 214 may include a plurality of transistors T41, T42, to T4n.

The transistors T41 to T4n may be connected between touch electrodes 110 of a fourth electrode group 104 and the second demultiplexer 220.

The transistors T41 to T4n may be provided in the same number as the touch electrodes 110 included in the fourth electrode group 104. In an embodiment, n transistors T41 to T4n may be connected one-to-one to n touch electrodes 110 included in the fourth electrode group 104.

For example, first electrodes of the transistors T41 to T4n may be connected to the touch electrodes 110 of the fourth electrode group 104, respectively, and second electrodes of the transistors T41 to T4n may be commonly connected to a fourth transistor M4 of the second demultiplexer 220.

In an embodiment, gate electrodes of the transistors T41 to T4n may be connected to the first control pads 321, respectively.

Accordingly, the transistors T41 to T4n can be turned on corresponding to the electrode selection signals Es1 to Esn supplied from the first control pads 321.

The second demultiplexer 220 may include a plurality of transistors M1, M2, M3, and M4.

The transistors M1 to M4 may be connected between the driving pad 310 and the sub-demultiplexers 211, 212, 213, and 214 of the first demultiplexer 210.

For example, a first electrode of the first transistor M1 may be commonly connected to the transistors T11 to T1n of the first sub-demultiplexer 211, and a second electrode of the first transistor M1 may be connected to the driving pad 310.

In an embodiment, a first electrode of the second transistor M2 may be commonly connected to the transistors T21 to T2n of the second sub-multiplexer 212, and a second electrode of the second transistor M2 may be connected to driving pad 310.

In an embodiment, a first electrode of the third transistor M3 may be commonly connected to the transistors T31 to T3n of the third sub-demultiplexer 213, and a second electrode of the third transistor M3 may be connected to the driving pad 310.

In an embodiment, a first electrode of the fourth transistor M4 may be commonly connected to the transistors T41 to T4n of the fourth demultiplexer 214, and a second electrode of the fourth transistor M2 may be connected to the driving pad 310.

Gate electrodes of the first to fourth transistors M1 to M4 may be connected to second control pads 322, respectively.

Accordingly, the first to fourth transistors M1 to M4 can be turned on corresponding to group selection signals Gs1, Gs2, Gs3, and Gsn supplied from the second control pads 322.

The first control pads 321 may be located on the second region A2 of the substrate 10. In an embodiment, the first control pads 321 may receive first control signals Cs1 supplied from an external source. For example, the first control signals Cs1 may include the electrode selection signals Es1 to Esn.

The second control pads 322 may be located on the second region A2 of the substrate 10. In an embodiment, the second control pads 322 may receive second control signals Cs2 supplied from the external source. For example, the second control signals Cs2 may include the group selection signals Gs1 to Gsn.

In an embodiment, the control signals Cs1 and Cs2 may be supplied to the control pads 321 and 322 through a separate driving device (not shown) in a test process before product shipment.

In an embodiment, the connecting member 450 may be attached to the control pads 321 and 322 after the test process, and the touch driving unit 460 may supply the control signals Cs1 and Cs2 to the control pads 321 and 322 through the connecting member 450.

Figure 4:
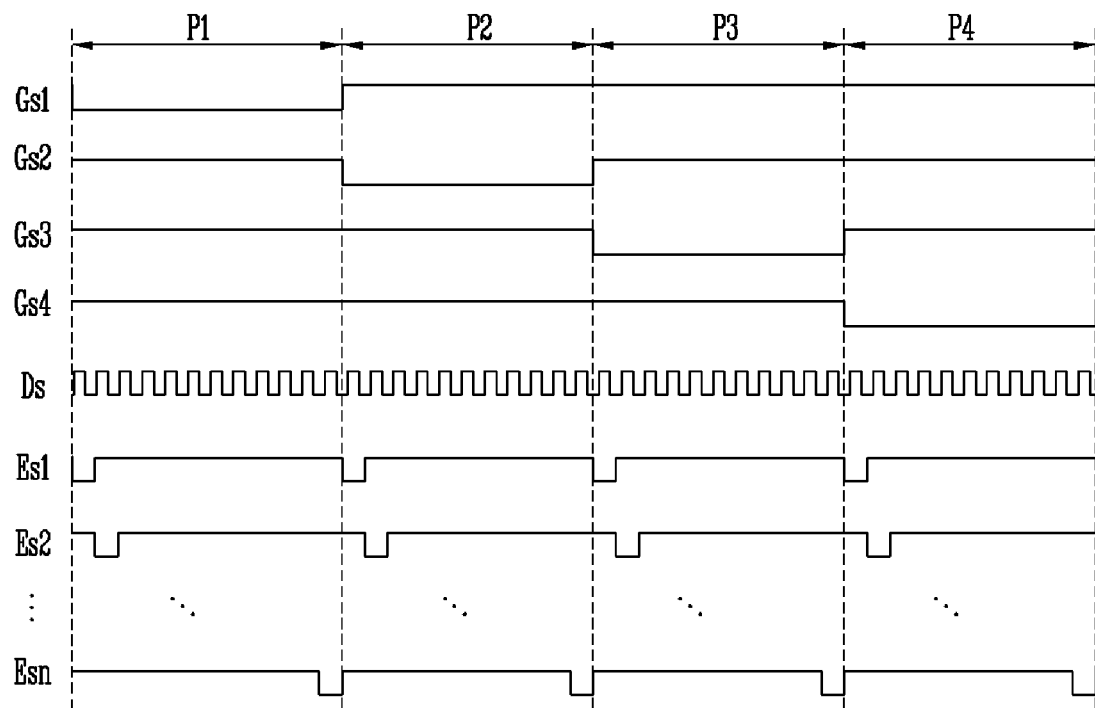
FIG. 4 is a view illustrating signals provided in a driving method of the touch sensor according to an embodiment.

FIG. 4 is a view illustrating signals used in a driving method of the touch sensor according to an embodiment. FIGS. 5A to 8C are views illustrating activated touch electrodes for different driving periods. In particular, in FIGS. 5A to 8C, touch electrodes 110 supplied with (copies of) a signal Ds are indicated by black.

Hereinafter, a driving method of the touch sensor 1 according to an embodiment will be described with reference to FIGS. 3, 4, and 5A to 8C.

Referring to FIG. 4, the driving method of the touch sensor 1 according to the embodiment may be performed during a driving period divided into a first period P1, a second period P2, a third period P3, and a fourth period P4.

First, a driving signal Ds may be continuously supplied to the driving pad 310 during the driving period P1 to P4 of the touch sensor 1.

A first group selection signal Gs1 may be supplied to the second demultiplexer 220 during the first period P1.

Therefore, the first transistor M1 of the second demultiplexer 220 may be turned on, and accordingly, the driving signal Ds may be supplied to the first sub-demultiplexer 211.

In an embodiment, as the electrode selection signals Es1 to Esn are sequentially supplied during the first period P1, the transistors T11 to T1$n$ included in the first sub-demultiplexer 211 may also be sequentially turned on.

Therefore, the driving signal Ds may be sequentially supplied to the touch electrodes 110 included in the first electrode group 101.

Figure 5A:
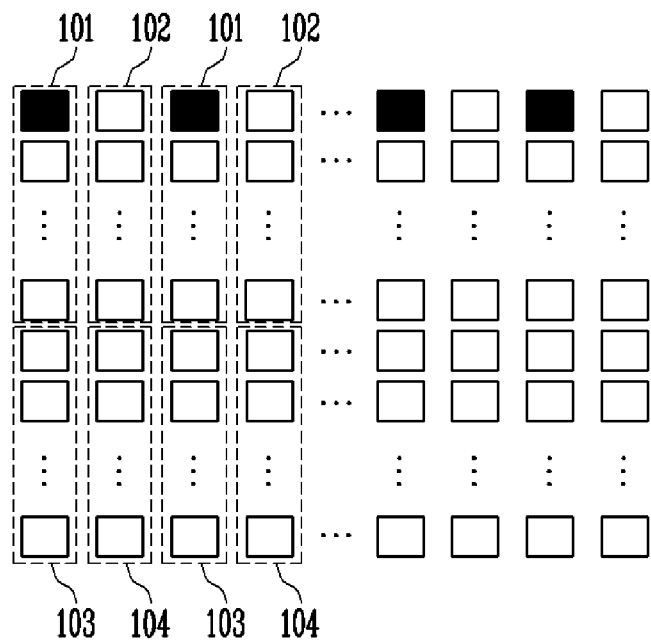
Figure 5B:
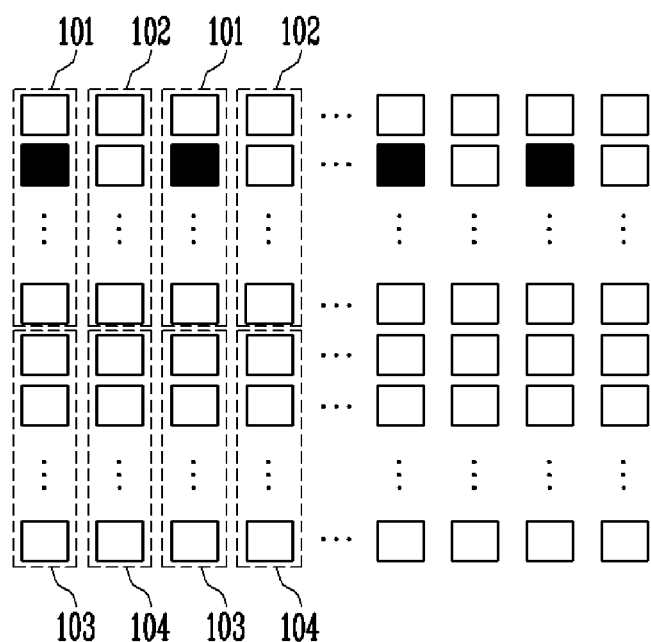

In an embodiment, as shown in FIGS. 5A to 5C, the touch electrodes 110 included in the first electrode group 101 may be sequentially supplied with the driving signal DS to be activated.

In an embodiment, a second group selection signal Gs2 may be supplied to the second demultiplexer 220 during the second period P2.

Therefore, the second transistor M2 of the second demultiplexer 220 may be turned on, and accordingly, the driving signal Ds may be supplied to the second sub-demultiplexer 212.

In an embodiment, as the electrode selection signals Es1 to Esn are sequentially supplied during the second period P2, the transistors T21 to T2$n$ included in the second sub-demultiplexer 212 may also be sequentially turned on.

Therefore, the driving signal Ds may be sequentially supplied to the touch electrodes 110 included in the second electrode group 102.

Figure 6A:
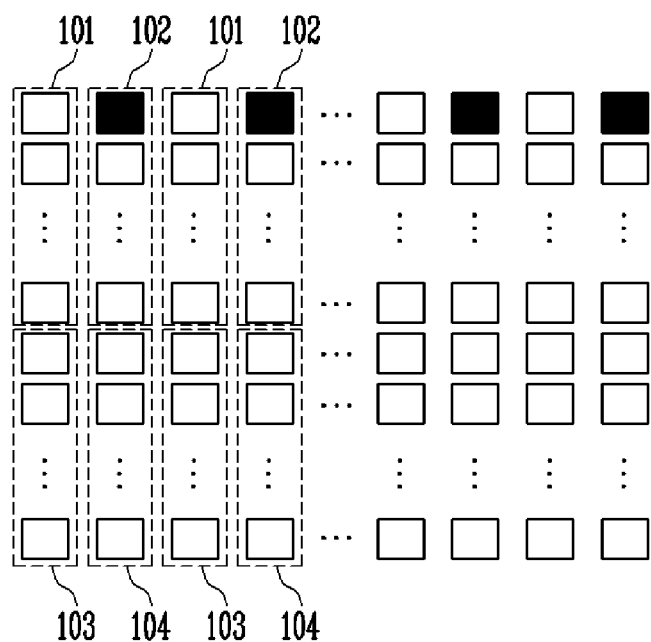
Figure 6B:
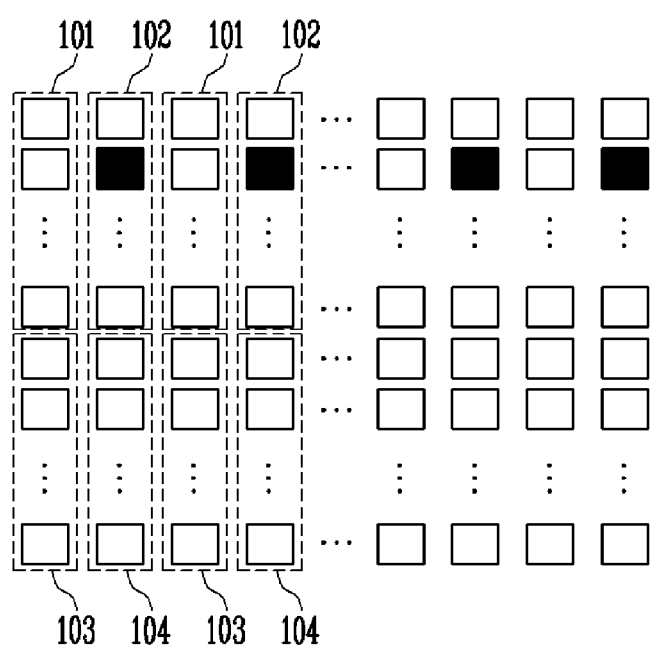

As shown in FIGS. 6A to 6C, the touch electrodes 110 included in the second electrode group 102 may be sequentially supplied with the driving signal Ds to be activated.

In an embodiment, a third group selection signal Gs3 may be supplied to the second demultiplexer 220 during the third period P3.

Therefore, the third transistor M3 of the second demultiplexer 220 may be turned on, and accordingly, the driving signal Ds may be supplied to the third sub-demultiplexer 213.

In an embodiment, as the electrode selection signals Es1 to Esn are sequentially supplied during the third period P3, the transistors T31 to T3$n$ included in the third sub-demultiplexer 213 may also be sequentially turned on.

Therefore, the driving signal Ds may be sequentially supplied to the touch electrodes 110 included in the third electrode group 103.

Figure 7A:
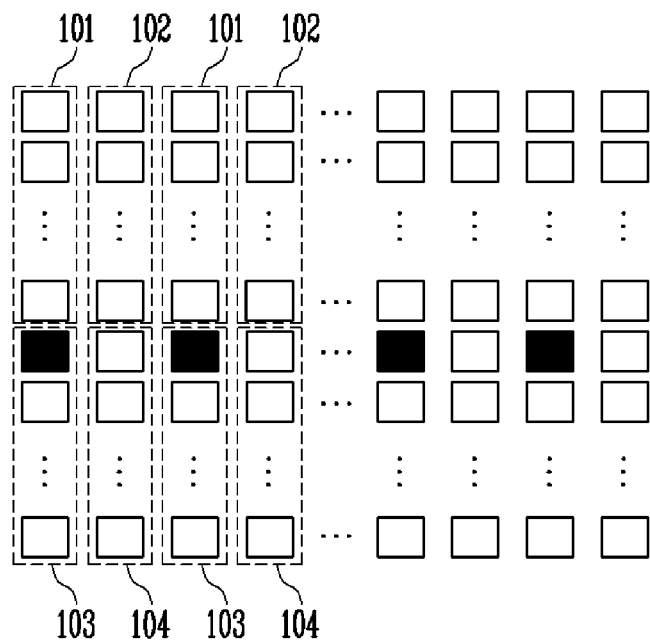
Figure 7B:
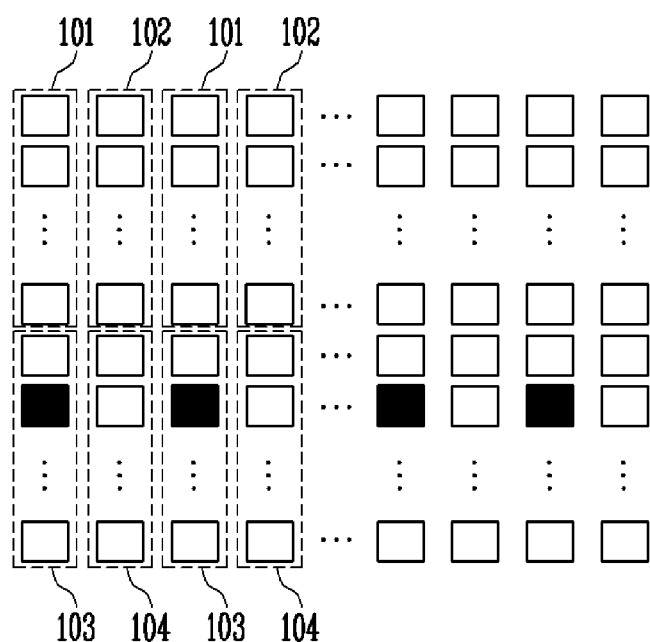
Figure 7C:
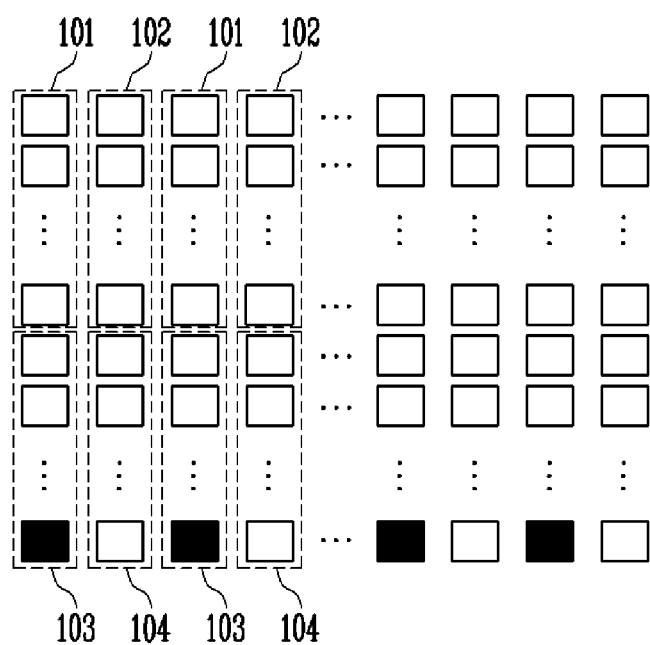

In an embodiment, as shown in FIGS. 7A to 7C, the touch electrodes 110 included in the third electrode group 103 may be sequentially supplied with the driving signal Ds to be activated.

In an embodiment, a fourth group selection signal Gs4 may be supplied to the second demultiplexer 220 during the fourth period P4.

Therefore, the fourth transistor M4 of the second demultiplexer 220 may be turned on, and accordingly, the driving signal Ds may be supplied to the fourth sub-demultiplexer 214.

In an embodiment, as the electrode selection signals Est to Esn are sequentially supplied during the fourth period P4, the transistors T41 to T4$n$ included in the fourth sub-demultiplexer 214 may also be sequentially turned on.

Therefore, the driving signal Ds may be sequentially supplied to the touch electrodes 110 included in the fourth electrode group 104.

Figure 8A:
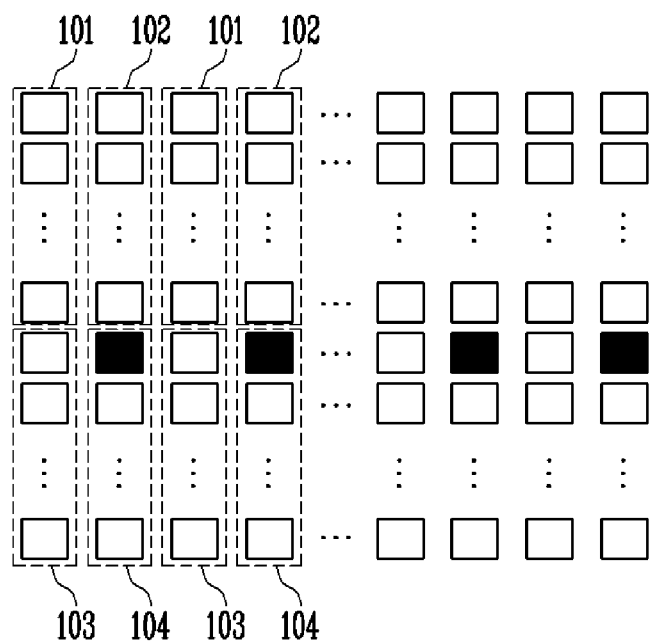
Figure 8B:
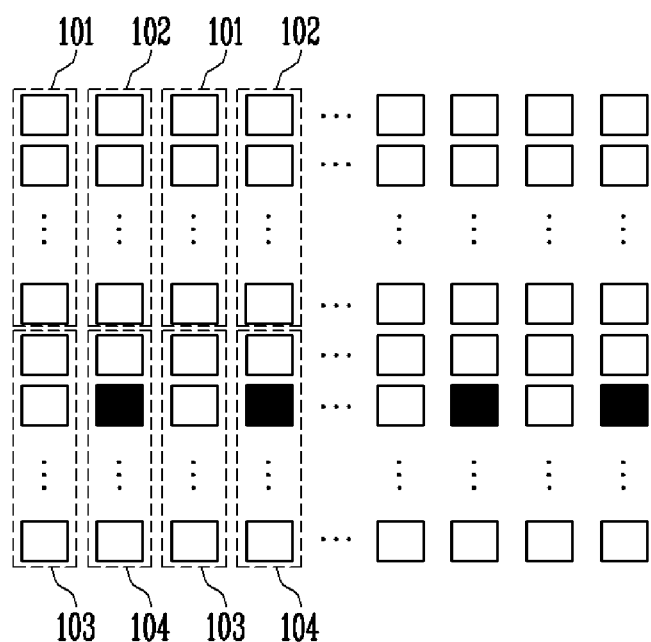
Figure 8C:
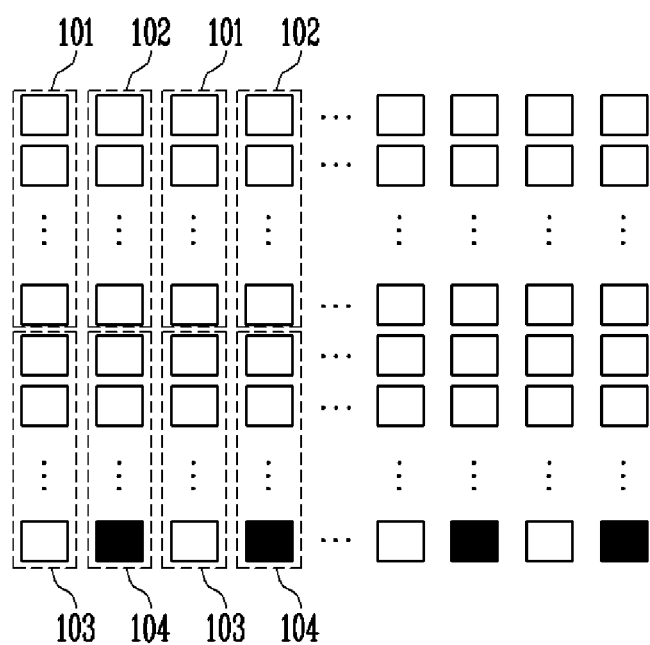

In an embodiment, as shown in FIGS. 8A to 8C, the touch electrodes 110 included in the fourth electrode group 104 may be sequentially supplied with the driving signal Ds to be activated.

Figure 9:
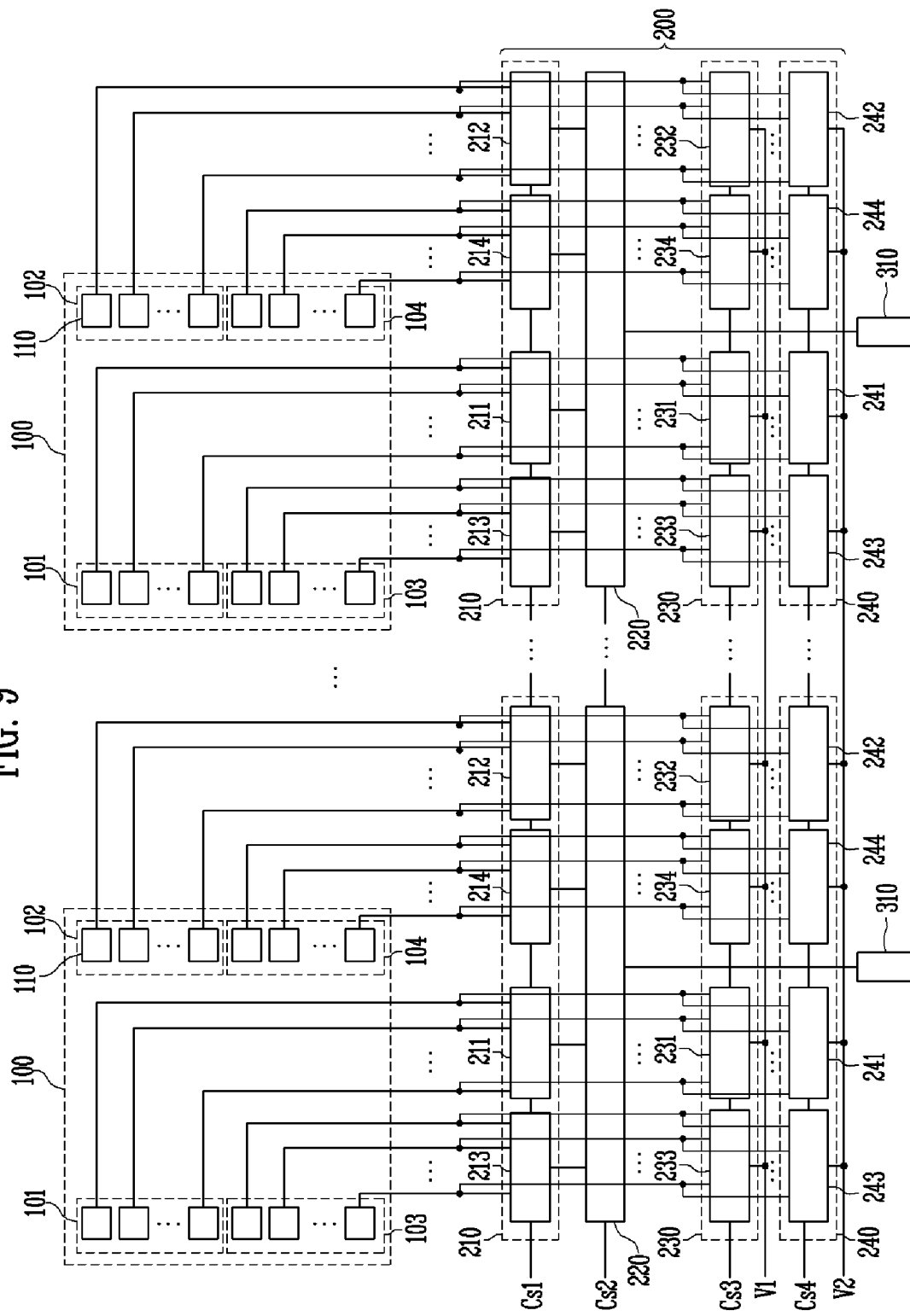
FIG. 9 is a view (e.g., plan view) illustrating third demultiplexers and fourth demultiplexers according to an embodiment.

FIG. 9 is a view illustrating third demultiplexers and fourth demultiplexers according to an embodiment.

Referring to FIG. 9, the demultiplexer 200 may further include third demultiplexers 230 and fourth demultiplexers 240.

The third demultiplexers 230 may be connected to the electrode units 100, respectively. In an embodiment, a third demultiplexer 230 may each include a plurality of sub-demultiplexers 231, 232, 233, and 234 respectively connected to the electrode groups 101, 102, 103, and 104 of a corresponding electrode unit 100.

For example, a third demultiplexer 230 may include a first sub-demultiplexer 231, a second sub-demultiplexer 232, a third sub-demultiplexer 233, and a fourth sub-demultiplexer 234.

The first sub-demultiplexer 231 may be connected to a first electrode group 101, and be supplied with a first voltage V1. In an embodiment, the first sub-demultiplexer 231 may selectively supply the first voltage V1 supplied thereto to touch electrodes 110 included in the first electrode group 101.

The second sub-demultiplexer 232 may be connected to a second electrode group 102, and be supplied with the first voltage V1. In an embodiment, the second sub-demultiplexer 232 may selectively supply the first voltage V1 supplied thereto to touch electrodes 110 included in the second electrode group 102.

The third sub-demultiplexer 233 may be connected to a third electrode group 103, and be supplied with the first voltage V1. In an embodiment, the third sub-demultiplexer 233 may selectively supply the first voltage V1 supplied thereto to touch electrodes 110 included in the third electrode group 103.

The fourth sub-demultiplexer 234 may be connected to a fourth electrode group 140, and be supplied with the first voltage V1. In an embodiment, the fourth sub-demultiplexer 234 may selectively supply the first voltage V1 supplied thereto to touch electrodes 110 included in the fourth electrode group 104.

The fourth demultiplexers 240 may be connected to the electrode units 100, respectively. In an embodiment, the fourth demultiplexers 240 may each include a plurality of demultiplexers 241, 242, 243, and 244 respectively connected to the electrode groups 101, 102, 103, and 104 of a corresponding electrode unit 100.

For example, each of the fourth demultiplexers 240 may include a first sub-demultiplexer 241, a second sub-demultiplexer 242, a third sub-demultiplexer 243, and a fourth sub-demultiplexer 244.

The first sub-demultiplexer 241 may be connected to the first electrode group 101, and be supplied with a second voltage V2. In an embodiment, the first sub-demultiplexer 241 may selectively supply the second voltage V2 supplied thereto to the touch electrodes 110 included in the first electrode group 101.

The second sub-demultiplexer 242 may be connected to the second electrode group 102, and be supplied with the second voltage V2. In an embodiment, the second sub-demultiplexer 242 may selectively supply the second voltage V2 supplied thereto to the touch electrodes 110 included in the second electrode group 102.

The third sub-demultiplexer 243 may be connected to the third electrode group 103, and be supplied with the second voltage V2. In an embodiment, the third sub-demultiplexer 243 may selectively supply the second voltage V2 supplied thereto to the touch electrodes 110 included in the third electrode group 103.

The fourth sub-demultiplexer 244 may be connected to the fourth electrode group 104, and be supplied with the second voltage V2. In an embodiment, the fourth sub-demultiplexer 244 may selectively supply the second voltage V2 supplied thereto to the touch electrodes 110 included in the fourth electrode group 104.

Here, a voltage value of the first voltage V1 may be higher than a voltage value of the second voltage V2. For example, the second voltage V2 may be set to a ground voltage.

In an embodiment, operations of the third demultiplexers 230 may be controlled by the same third control signals Cs3, and operations of the fourth demultiplexers 240 may be controlled by the same control signals Cs4.

Figure 10:
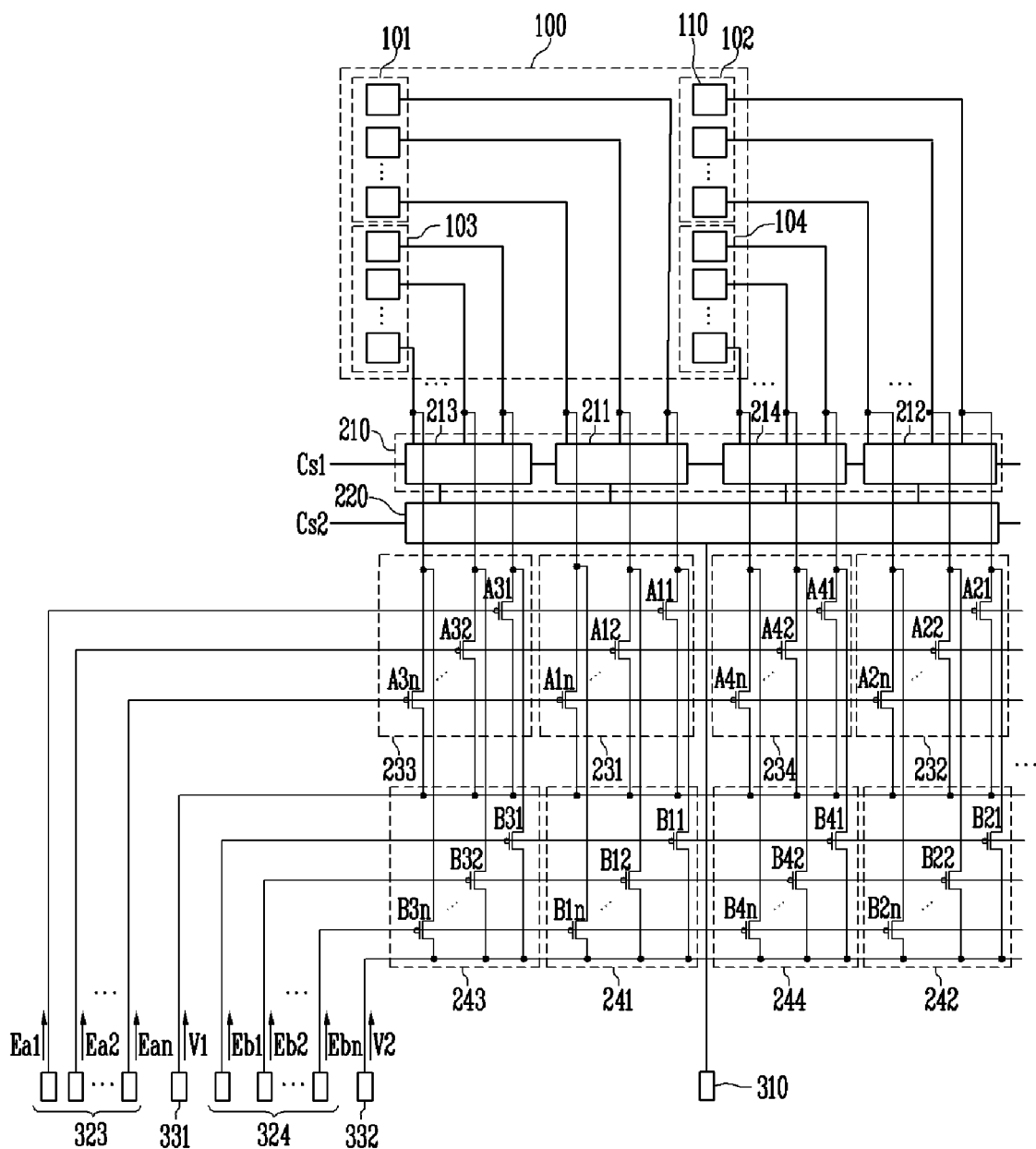
FIG. 10 is a view illustrating a circuit configuration of a third demultiplexer and a fourth demultiplexer according to an embodiment.

FIG. 10 is a view illustrating a circuit configuration of a third demultiplexer and a fourth demultiplexer according to an embodiment. An electrode unit 100, a first demultiplexer 210, a second demultiplexer 220, a third demultiplexer 230, and a fourth demultiplexer 240, which are related to one driving pad 310, are illustrated in FIG. 10.

Referring to FIG. 10, a first sub-demultiplexer 231 of the third demultiplexer 230 may include a plurality of transistors A11, A12, to A1$n$.

The transistors A11 to A1$n$ may be connected between touch electrodes 110 of a first electrode group 101 and a first voltage pad 331.

The transistors A11 to A1$n$ may be provided in the same number as the touch electrodes 110 included in the first electrode group 101. In an embodiment, n transistors A11 to A1$n$ may be connected one-to-one to n touch electrodes 110 included in the first electrode group 101.

For example, first electrodes of the transistors A11 to A1$n$ may be connected to the touch electrodes 110 of the first electrode group 101, respectively, and second electrodes of the transistors A11 to A1$n$ may be commonly connected to the first voltage pad 331.

In an embodiment, gate electrodes of the transistors A11 to A1$n$ may be connected to third control pads 323, respectively.

Accordingly, the transistors A11 to A1$n$ can be turned on corresponding to electrode selection signals Ea1, Ea2, to Ean supplied from the third control pads 323.

A second sub-demultiplexer 232 of the third demultiplexer 230 may include a plurality of transistors A21, A22, to A2$n$.

The transistors A21 to A2$n$ may be connected between touch electrodes 110 of a second electrode group 102 and the first voltage pad 331.

The transistors A21 to A2$n$ may be provided in the same number as the touch electrodes 110 included in the second electrode group 102. In an embodiment, n transistors A21 to A2$n$ may be connected one-to-one to n touch electrodes 110 included in the second electrode group 102.

For example, first electrodes of the transistors A21 to A2$n$ may be connected to the touch electrodes 110 of the second electrode group 102, respectively, and second electrodes of the transistors A21 to A2$n$ may be commonly connected to the first voltage pad 331.

In an embodiment, gate electrodes of the transistors A21 to A2$n$ may be connected to the third control pads 323, respectively.

Accordingly, the transistors A21 to A2$n$ can be turned on corresponding to the electrode selection signals Ea1 to Ean supplied from the third control pads 323.

A third sub-demultiplexer 233 of the third demultiplexer 230 may include a plurality of transistors A31, A32, to A3$n$.

The transistors A31 to A3$n$ may be connected between touch electrodes 110 of a third electrode group 103 and the first voltage pad 331.

The transistors A31 to A3$n$ may be provided in the same number as the touch electrodes 110 included in the third electrode group 103. In an embodiment, n transistors A31 to A3$n$ may be connected one-to-one to n touch electrodes 110 included in the third electrode group 103.

For example, first electrodes of the transistors A31 to A3$n$ may be connected to the touch electrodes 110 of the third electrode group 103, respectively, and second electrodes of the transistors A31 to A3$n$ may be commonly connected to the first voltage pad 331.

In an embodiment, gate electrodes of the transistors A31 to A3$n$ may be connected to the third control pads 323, respectively.

Accordingly, the transistors A31 to A3$n$ can be turned on corresponding to the electrode selection signals Ea1 to Ean supplied from the third control pads 323.

A fourth sub-demultiplexer 234 of the third demultiplexer 230 may include a plurality of transistors A41, A42, to A4$n$.

The transistors A41 to A4$n$ may be connected between touch electrodes 110 of a fourth electrode group 104 and the first voltage pad 331.

The transistors A41 to A4n may be provided in the same number as the touch electrodes 110 included in the fourth electrode group 104. In an embodiment, n transistors A41 to A4n may be connected one-to-one to n touch electrodes 110 included in the fourth electrode group 104.

For example, first electrodes of the transistors A41 to A4n may be connected to the touch electrodes 110 of the fourth electrode group 101, respectively, and second electrodes of the transistors A41 to A4n may be commonly connected to the first voltage pad 331.

In an embodiment, gate electrodes of the transistors A41 to A4n may be connected to the third control pads 323, respectively.

Accordingly, the transistors A41 to A4n can be turned on corresponding to the electrode selection signals Ea1 to Ean supplied from the third control pads 323.

A first sub-demultiplexer 241 of the fourth demultiplexer 240 may include a plurality of transistors B11, B12, to B1n.

The transistors B11 to B1n may be connected between the touch electrodes 110 of the first electrode group 101 and a second voltage pad 332.

The transistors B11 to B1n may be provided in the same number as the touch electrodes 110 included in the first electrode group 101. In an embodiment, n transistors B11 to B1n may be connected one-to-one to n touch electrodes 110 included in the first electrode group 101.

For example, first electrodes of the transistors B11 to B1n may be connected to the touch electrodes 110 of the first electrode group 101, respectively, and second electrodes of the transistors B11 to B1n may be commonly connected to the second voltage pad 332.

In an embodiment, gate electrodes of the transistors B11 to B1n may be connected to fourth control pads 324, respectively.

Accordingly, the transistors B11 to B1n can be turned on corresponding to electrode selection signals Eb1, Eb2, to Ebn supplied from the fourth control pads 324.

A second sub-demultiplexer 242 of the fourth demultiplexer 240 may include a plurality of transistors B21, B22, to B2n.

The transistors B21 to B2n may be connected between the touch electrodes 110 of the second electrode group 102 and the second voltage pad 332.

The transistors B21 to B2n may be provided in the same number as the touch electrodes 110 included in the second electrode group 102. In an embodiment, n transistors B21 to B2n may be connected one-to-one to n touch electrodes 110 include in the second electrode group 102.

For example, first electrodes of the transistors B21 to B2n may be connected to the touch electrodes 110 of the second group 102, respectively, and second electrodes of the transistors B21 to B2n may be commonly connected to the second voltage pad 332.

In an embodiment, gate electrodes of the transistors B21 to B2n may be connected to the fourth control pads 324, respectively.

Accordingly, the transistors B21 to B2n can be turned on corresponding to the electrode selection signals Eb1 to Ebn supplied from the fourth control pads 324.

A third sub-demultiplexer 243 of the fourth demultiplexer 240 may include a plurality of transistors B31, B32, to B3n.

The transistors B31 to B3n may be connected between the touch electrodes 110 of the third electrode group 103 and the second voltage pad 332.

The transistors B31 to B3n may be provided in the same number as the touch electrodes 110 included in the third electrode group 103. In an embodiment, n transistors B31 to B3n may be connected one-to-one to n touch electrodes 110 included in the third electrode group 103.

For example, first electrodes of the transistors B31 to B3n may be connected to the touch electrodes 110 of the third electrode group 103, respectively, and second electrodes of the transistors B31 to B3n may be commonly connected to the second voltage pad 332.

In an embodiment, gate electrodes of the transistors B31 to B3n may be connected to the fourth control pads 324, respectively.

Accordingly, the transistors B31 to B3n can be turned on corresponding to the electrode selection signals Eb1 to Ebn supplied from the fourth control pads 324.

A fourth sub-demultiplexer 244 of the fourth demultiplexer 240 may include a plurality of transistors B41, B42, to B4n.

The transistors B41 to B4n may be connected between the touch electrodes 110 of the fourth electrode group 104 and the second voltage pad 332.

The transistors B41 to B4n may be provided in the same number as the touch electrodes 110 included in the fourth electrode group 104. In an embodiment, n transistors B41 to B4n may be connected one-to-one to n touch electrodes 110 included in the fourth electrode group 104.

For example, first electrodes of the transistors B41 to B4n may be connected to the touch electrodes 110 of the fourth electrode group 104, respectively, and second electrodes of the transistors B41 to B4n may be commonly connected to the second voltage pad 332.

In an embodiment, gate electrodes of the transistors B41 to B4n may be connected to the fourth control pads 324, respectively.

Accordingly, the transistors B41 to B4n can be turned on corresponding to the electrode selection signals Eb1 to Ebn supplied from the fourth control pads 324.

The third control pads 323 may be located on the second region A2 of the substrate 10. In an embodiment, the third control pads 323 may receive third control signals Cs3 supplied from the outside. For example, the third control signals Cs3 may include the electrode selection signals Ea1 to Ean.

The fourth control pads 324 may be located on the second region A2 of the substrate 10. In an embodiment, the fourth control pads 324 may receive fourth control signals Cs4 supplied from the outside. For example, the fourth control signals Cs4 may include the electrode selection signals Eb1 to Ebn.

In an embodiment, the control signals Cs3 and Cs4 may be supplied to the control pads 323 and 324 through a separate driving device (not shown) in a test process before product shipment.

In an embodiment, the connecting member 450 may be attached to the control pads 323 and 324 after the test process, and the touch driving unit 460 may supply the control signals Cs3 and Cs4 to the control pads 323 and 324 through the connecting member 450.

According to the above-described configuration, the third demultiplexers 230 may supply the first voltage V1 to some touch electrodes 110 that do not receive the driving signal Ds during the driving period, and the fourth demultiplexers 240 may supply the second voltage V2 to other touch electrodes 110 that do not receive the driving signal Ds during the driving period.

For example, all the touch electrodes 110 except touch electrodes 110 currently supplied with the driving signal Ds may be supplied with the first voltage V1 or the second voltage V2 during the driving period.

In an embodiment, all the touch electrodes 110 except touch electrodes 110 currently supplied with the driving signal Ds may be all set to a floating state. In an embodiment, all the touch electrodes 110 except touch electrodes 110 currently supplied with the driving signal Ds may be set to a specific voltage, so that interference between touch signals can be minimized, thereby improving touch sensitivity.

For example, in relation to FIG. 4 described above, during each period P1, P2, P3, or P4, touch electrodes 110 except the touch electrodes 110 currently supplied with the driving signal Ds may be supplied with at least one of the first voltage V1 and the second voltage V2.

In an embodiment, some touch electrodes 100 not currently receiving the driving signal Ds may be supplied with the first voltage V1, and other touch electrodes 110 not currently receiving the driving signal Ds may be supplied with the second voltage V2.

Figure 11:
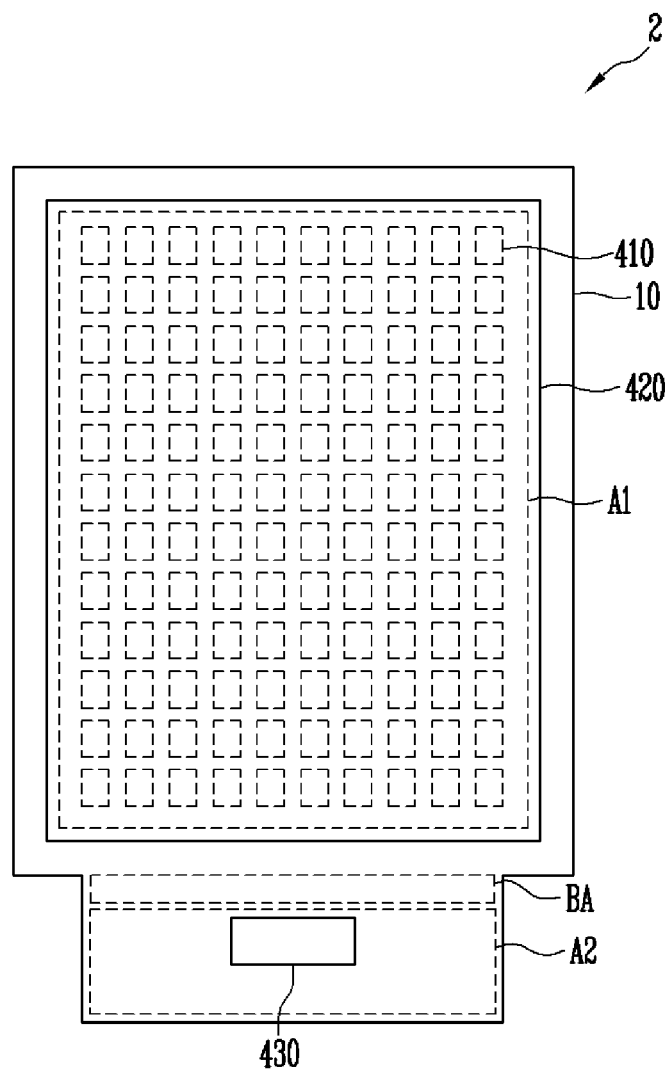
FIG. 11 is a view (e.g., plan view) illustrating a display device according to an embodiment.

FIG. 11 is a view illustrating a display device 2 according to an embodiment.

Referring to FIG. 11, the display device 2 may include a substrate 10, pixels 410, an encapsulation layer 420, and a display driver 430.

The substrate 10 may include a first region A1 and a second region A2. The first region A1 is a region in which the pixels 410 are located, and may be referred to as a display region in which an image is displayed. The display region may correspond to the touch active region described above.

In an embodiment, the remaining region located at the periphery of the first region A1 may be referred to as a non-display region, and the second region A2 may be defined as a partial region in the non-display region.

The second region A2 is a region in which the display driver 430 is located, and may be located at one side of the first region A1.

In an embodiment, the substrate 10 may further include a bending region BA located between the first region A1 and the second region A2.

The bending region BA means a portion at which the substrate 10 is bent, and the second region A2 may be located adjacent to a rear surface of the substrate 10 due to the bending region BA.

The pixels 410 may be located on the first region A1 of the substrate 10, and each of the pixels 410 emits light of a specific color, so that a predetermined image can be provided to a user.

The encapsulation layer 420 may be formed on the pixels 410, to cover and protect the pixels 410.

In an embodiment, the encapsulation layer 420 blocks the pixels 410 from being exposed to moisture, oxygen, etc., thereby preventing damage of the pixels 410.

In an embodiment, the encapsulation layer 420 may be formed in a structure including a plurality of stacked layers. For example, the encapsulation layer 420 may include at least one organic layer (not shown) and at least one inorganic layer (not shown).

When the encapsulation layer 420 is formed in a multi-layered structure, organic and inorganic layers may be alternately stacked.

The display driver 430 may be located on the second area A2 of the substrate 10. The display driver 430 may control emission operations of the pixels 410.

Figure 12:
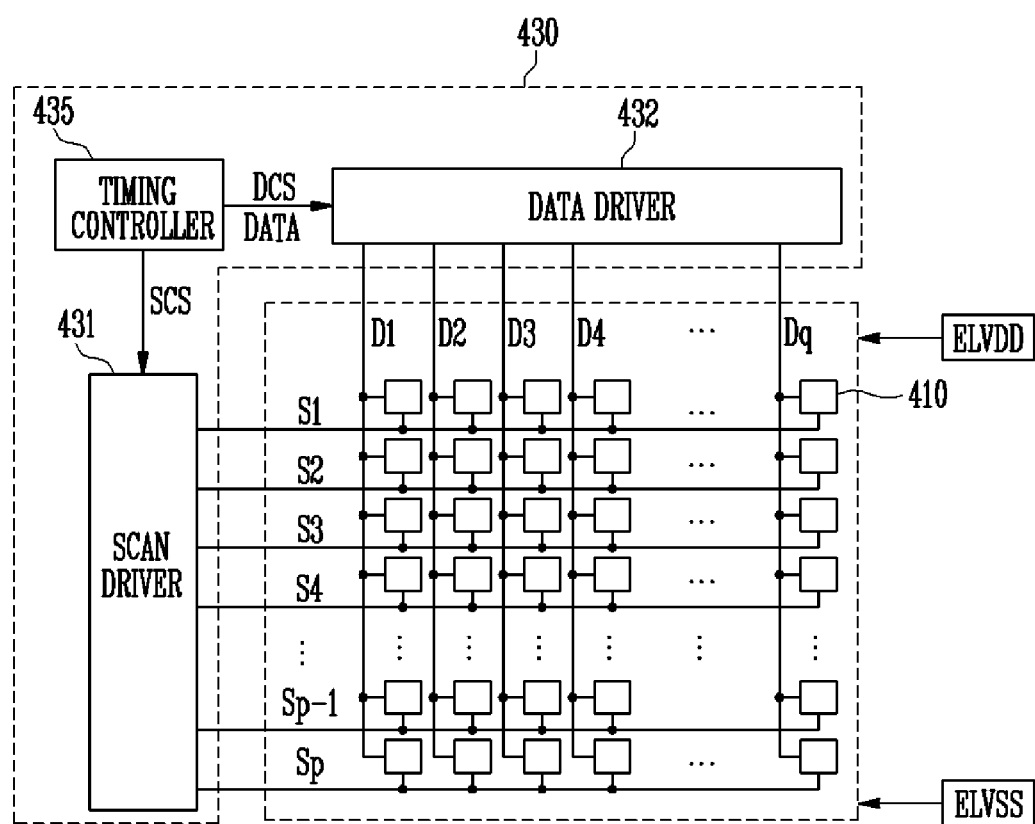
FIG. 12 is a view (e.g., plan view and/or block diagram) illustrating a display driver and pixels of a display device according to an embodiment.

FIG. 12 is a view illustrating a display driver and pixels according to an embodiment.

Referring to FIG. 12, the pixels 410 may be connected to data lines D1, D2, D3, D4 to Dq and the scan lines S1, S2, S3, S4 to Sp-1, Sp. For example, the pixels 410 may be arranged in a matrix form in intersection portions of the data lines D1 to Dq and the scan lines S1 to Sp.

The pixels 410 may be supplied with data and scan signals through the data lines D1 to Dq and the scan lines S1 to Sp.

In an embodiment, the pixels 410 may be connected to a first power source ELVDD and a second power source ELVSS.

Each of the pixels 410 may include a light emitting device (e.g., an organic light emitting diode). Each of the pixels 410 may generate light corresponding to a data signal by current flowing from the first power source ELVDD to the second power source ELVSS via the light emitting device.

The display driver 430 may include a scan driver 431, a data driver 432, and a timing controller 435.

The scan driver 431 may supply scan signals to the scan lines S1 to Sp in response to a scan driver control signal SCS. For example, the scan driver 431 may sequentially supply scan signals to the scan lines S1 to Sp.

The data driver 432 may generate a data signal by receiving a data driver control signal DCS and image data DATA, input from the timing controller 435.

The data driver 432 may supply the generated data signal to the data lines D1 to Dq.

If a scan signal is supplied to a specific scan line, some pixels 410 connected to the specific scan line may receive a data signal supplied from the data lines D1 to Dq. The some pixels 410 may emit light with a luminance corresponding to the received data signal.

The timing controller 435 may generate control signals for controlling the scan driver 431 and the data driver 432.

For example, the control signals may include the scan driver control signal SCS for controlling the scan driver 431 and the data driver control signal DCS for controlling the data driver 432.

In an embodiment, the timing controller 435 may generate the scan driver control signal SCS and the data driver control signal DCS, using an external input signal.

In an embodiment, the timing controller 435 may supply the scan driver control signal SCS to the scan driver 431, and supply the data driver control signal DCS to the data driver 432.

The timing controller 435 may convert image data input from the outside into image data DATA suitable for specifications of the data driver 432 and supply the image data DATA to the data driver 432.

The scan driver 431, the data driver 432, and the timing controller 435 may be formed in one integrated circuit (IC).

Figure 13:
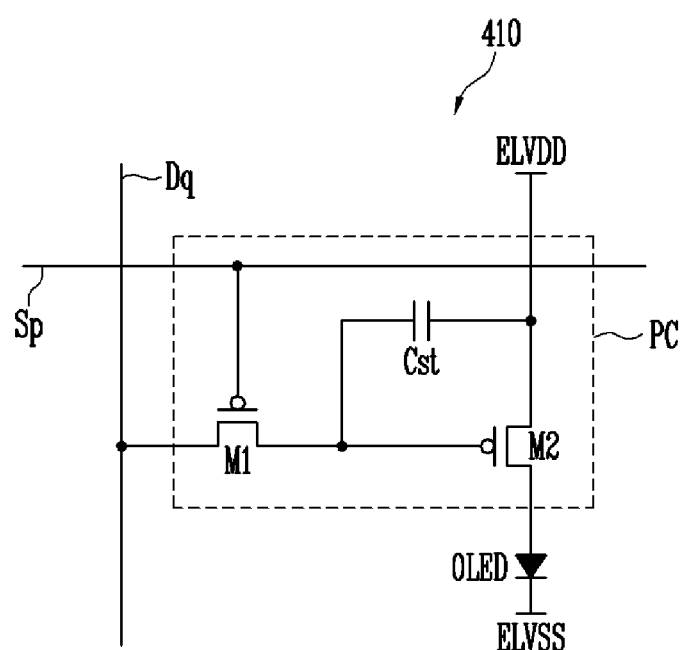
FIG. 13 is a view illustrating an embodiment of the pixel shown in FIG. 12.

FIG. 13 is a view illustrating an embodiment of the pixel shown in FIG. 12. In particular, for convenience of description, a pixel 410 connected to a pth scan line Sp and a qth data line Dq is illustrated in FIG. 13.

First, referring to FIG. 13, the pixel 410 includes an organic light emitting diode OLED, and a pixel circuit PC coupled to the qth data line Dq and the pth scan line Sp to control the organic light emitting diode OLED.

An anode electrode of the organic light emitting diode OLED may be connected to the pixel circuit PC, and a cathode electrode of the organic light emitting diode OLED may be connected to the second power source ELVSS.

The organic light emitting diode OLED may generate light with a predetermined luminance, corresponding to current supplied from the pixel circuit PC.

The pixel circuit PC may store a data signal supplied to the qth data line Dq when a scan signal is supplied to the pth scan line Sp. The pixel circuit PC may control the amount of current supplied to the organic light emitting diode OLED, corresponding to the stored data signal.

For example, the pixel circuit PC may include a first transistor M1, a second transistor M2, and a storage capacitor Cst.

The first transistor M1 may be connected between the qth data line Dq and the second transistor M2.

For example, a gate electrode of the first transistor M1 may be connected to the pth scan line Sp, a first electrode of the first transistor M1 may be connected to the qth data line Dq, and a second electrode of the first transistor M1 may be connected to a gate electrode of the second transistor M2.

The first transistor M1 may be turned on when the scan signal is supplied to the pth scan line Sp, to supply a data signal from the qth data line Dq to the storage capacitor Cst.

In an embodiment, the storage capacitor Cst may charge a voltage corresponding to the data signal.

The second transistor M2 may be connected between the first power source ELVDD and the organic light emitting diode OLED.

For example, the gate electrode of the second transistor M2 may be connected to a first electrode of the storage capacitor Cst and the second electrode of the first transistor M1, a first electrode of the second transistor M2 may be connected to a second electrode of the storage capacitor Cst and the first power source ELVDD, and a second electrode of the second transistor M2 may be connected to the anode electrode of the organic light emitting diode OLED.

The second transistor M2 is a driving transistor, and may control the amount of current flowing from the first power source ELVDD to the second power source ELVSS via the organic light emitting diode OLED, corresponding to a voltage value stored in the storage capacitor Cst.

In an embodiment, the organic light emitting diode OLED may generate light corresponding to the amount of current supplied from the second transistor M2.

Here, the first electrode of each of the transistors M1 and M2 may be set as any one of a source electrode and a drain electrode, and the second electrode of each of the transistors M1 and M2 may be set as an electrode different from the first electrode. For example, if the first electrode is set as a source electrode, the second electrode may be set as a drain electrode.

In an embodiment, a case where the transistors M1 and M2 are PMOS transistors is illustrated in FIG. 13. However, in another embodiment, the transistors M1 and M2 may be implemented as NMOS transistors.

The above-described pixel structure of FIG. 13 is merely an embodiment, and the pixel 410 is not limited to the pixel structure. Actually, the pixel 410 may have a circuit structure in which current can be supplied to the organic light emitting diode OLED, and be selected as any one of various structures currently known in the art.

The first power source ELVDD may be a high-potential power source, and the second power source ELVSS may be a low-potential power source.

For example, the first power source ELVDD may be set to a positive voltage, and the second power source ELVSS may be set to a negative voltage or a ground voltage.

Figure 14:
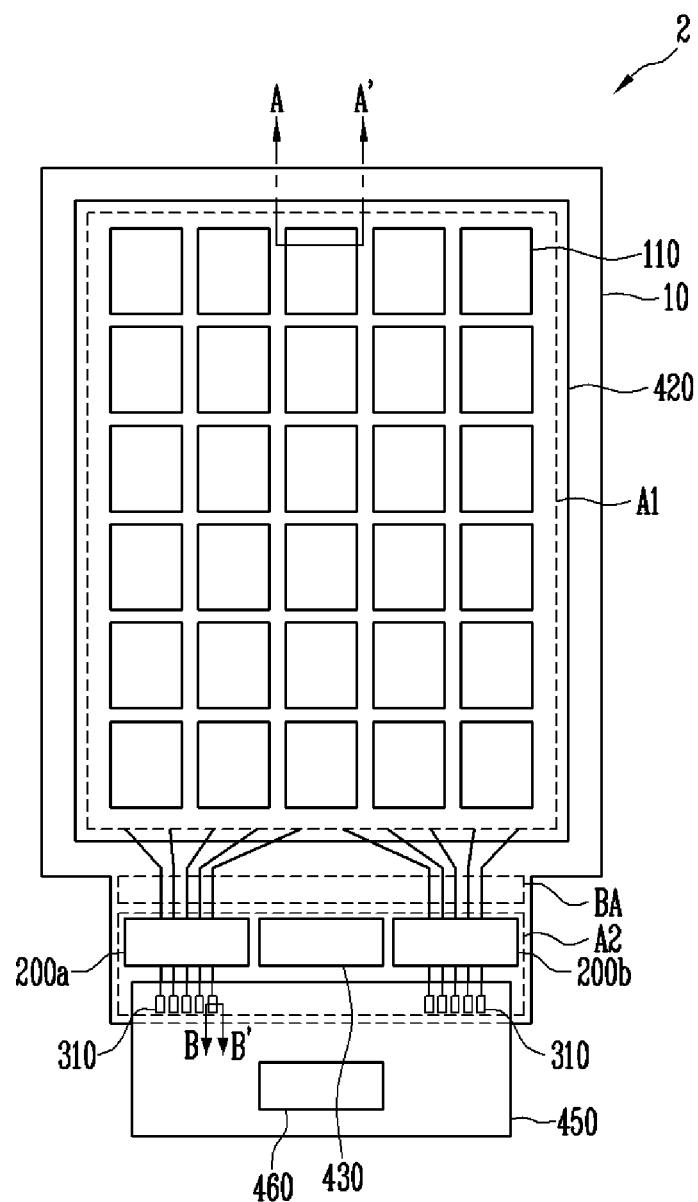
FIG. 14 is a view (e.g., plan view) illustrating a display device according to an embodiment.

FIG. 14 is a view illustrating the display device according to the embodiment.

Referring to FIG. 14, the display device 2 according to the embodiment may further include touch electrodes 110, a demultiplexer 200a and 200b, and driving pads 310.

The touch electrodes 110 may be located on the encapsulation layer 420. As described above, the touch electrodes 110 may constitute a plurality of electrode groups 101, 102, 103, and 104, and electrode units 100.

The demultiplexer 200a and 200b may be located on the second region A2 of the substrate 10. In an embodiment, the demultiplexer 200a and 200b may selectively connect the touch electrodes 110 electrically to the driving pads 310.

In an embodiment, in order to efficiently use the non-display region, one portion 200a of the demultiplexer 200a and 200b may be disposed at a first side of the display driver 430, and the other portion of the demultiplexer 200a and 200b may be disposed at a second side of the display driver 430 that is opposite the first side of the display driver 430. According to the above-described configuration, the total area of unnecessary dead spaces (i.e., areas not used for displaying images or receiving touches) can be minimized.

For example, some of the first demultiplexers 210 and some of the second demultiplexers 220 may be located at the first side of the display driver 430, and other first demultiplexers 210 and other second demultiplexers 220 may be located at the second side of the display driver 430.

In an embodiment, some of the third demultiplexers 230 and some of the fourth demultiplexers 240 may be located at the first side of the display driver 430, and other third demultiplexers 230 and other fourth demultiplexers 240 may be located at the second side of the display driver 430.

In an embodiment, the display device 2 according to the embodiment may further include a connecting member 450 and a touch driving unit 460.

The connecting member 450 may be attached to the driving pads 310, and the touch driving unit 460 may supply driving signals to the driving pads 310 through the connecting member 450. In an embodiment, the touch driving unit 460 may be mounted on the connecting member 450.

Figure 15A:
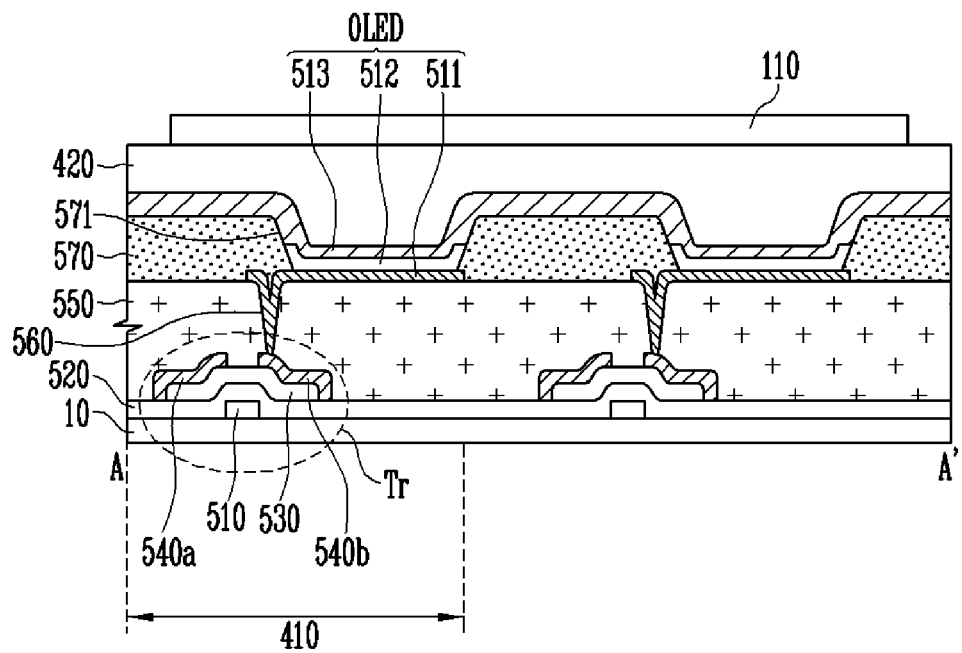
FIG. 15A and FIG. 15B are cross-sectional views taken along line A-A' of FIG. 14 according to one or more embodiments.
Figure 15B:
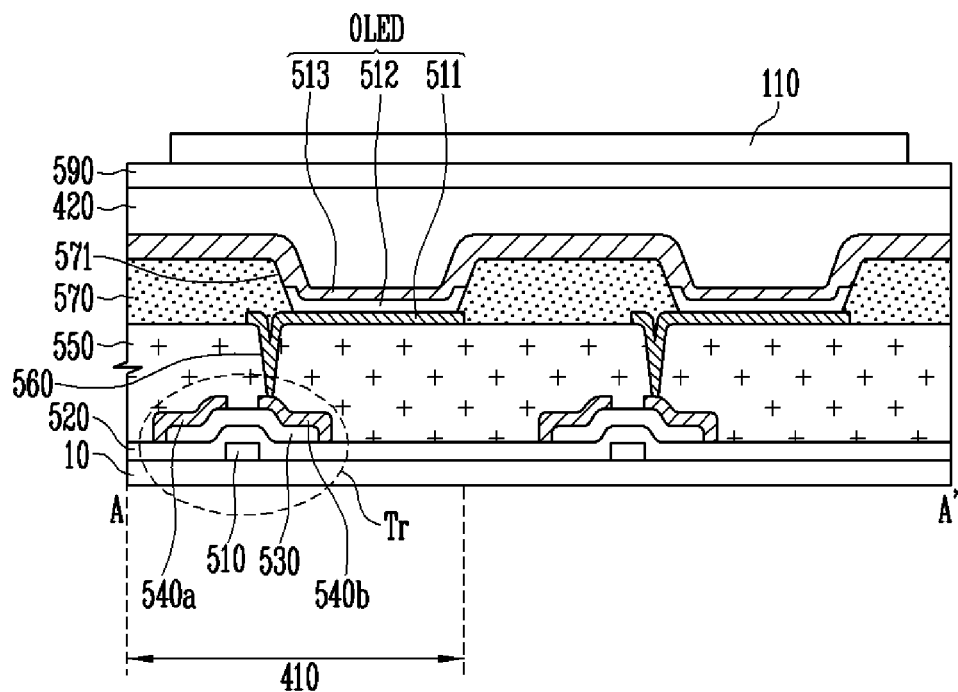
Figure 15C:
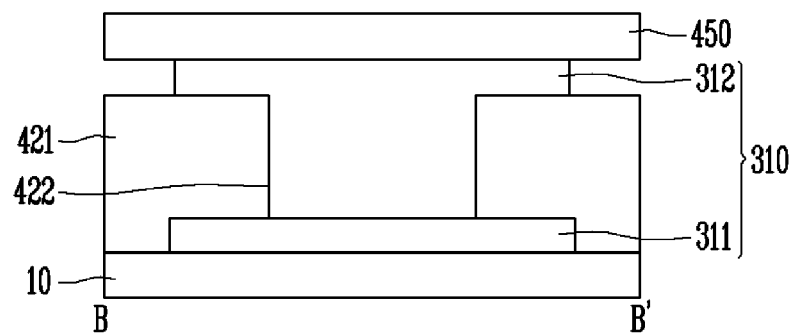
FIG. 15C is a cross-sectional view taken along line B-B' of FIG. 14 according to an embodiment.

FIGS. 15A and 15B are cross-sectional views taken along line A-A' of FIG. 14 according to one or more embodiments, and FIG. 15C is a cross-sectional view taken along line B-B' of FIG. 14 according to an embodiment.

Referring to FIG. 15A, the organic light emitting diode OLED according to the embodiment may include a first electrode 511, an emitting layer 512, and a second electrode 513.

The emitting layer 512 may be located between the first electrode 511 and the second electrode 513. In an embodiment, the first electrode 511 and the second electrode 513 may serve as an anode electrode and a cathode electrode, respectively.

For example, the emitting layer 512 may preferably include an organic emission layer for self-luminescence.

In an embodiment, the emitting layer 512 may be formed in a structure in which a hole transporting layer, the organic emission layer, and an electron transporting layer are stacked. In an embodiment, the emitting layer 512 may further include a hole injection layer and an electron injection layer.

According to the above-described structure, holes injected from the first electrode 511 and electrons injected from the second electrode 513 are combined in the organic emission layer to form excitons, and light having a specific wavelength is generated from each emitting layer 512 by energy from the formed excitons.

In an embodiment, a plurality of pixels 410 may be located on the substrate 10. In an embodiment, each pixel 410 may be configured with a pixel circuit (not shown) including a driving transistor Tr and the organic light emitting diode OLED.

For convenience of description, only the driving transistor Tr directly related to the organic light emitting diode OLED is illustrated in FIGS. 15A and 15B. However, in order to control emission of the organic light emitting diode OLED, the pixel circuit (not shown) may be additionally provided with another transistor, a capacitor, and the like, in addition to the driving transistor Tr.

A buffer layer (not shown) for preventing diffusion of impurities contained in the substrate 10 may be located on the substrate 10. In an embodiment, the buffer layer may be formed in a single- or multi-layered structure.

The driving transistor Tr may be formed on the substrate 10. The driving transistor Tr may be formed corresponding to each organic light emitting diode OLED.

The driving transistor Tr may include a gate electrode 510, a gate insulating layer 520, a semiconductor layer 530, and source/drain electrodes 540a and 540b.

The gate electrode 510 may be formed on the substrate 10.

The gate insulating layer 520 may be formed over the gate electrode 510. For example, the gate insulating layer 520 may be formed of an insulating material such as silicon oxide (SiOx) or silicon nitride (SiNx).

The semiconductor layer 530 may be formed on the gate insulating layer 520. For example, the semiconductor layer 530 may be formed of poly-silicon obtained by crystallizing amorphous silicon using laser, etc.

In an embodiment, the semiconductor layer 530 may be formed of amorphous silicon, oxide semiconductor, etc., in addition to the poly-silicon.

The source/drain electrodes 540a and 540b may be located at both sides of the semiconductor layer 530, respectively.

A planarization layer 550 may be located over the driving transistor Tr, and be provided with a contact hole 560 that exposes the source electrode 540a or the drain electrode 540b. In FIGS. 15A and 15B, a case where the drain electrode 540b is exposed through the contact hole 560 is illustrated as an example.

The gate electrode 510 and the source/drain electrodes 540a and 540b may be formed of a metal such as molybdenum (Mo), tungsten (W), titanium (Ti), or aluminum (Al), an alloy thereof, or a stack structure thereof, but the present disclosure is not limited thereto.

In an embodiment, the driving transistor Tr is not limited to the structure shown in FIGS. 15A and 15B, and may be modified to have another structure. For example, the transistor Tr having a bottom gate structure is illustrated in FIGS. 15A and 15B, but may be modified to have a top gate structure.

The first electrode 511 is formed on the planarization layer 550, and may be connected to the source electrode 540a or the drain electrode 540b through the contact hole 560. In FIGS. 15A and 15B, a case where the first electrode 511 is connected to the drain electrode 540b through the contact hole 560 is illustrated as an example.

For example, the planarization layer 550 may be formed of an insulating material such as silicon oxide or silicon nitride.

A pixel defining layer 570 may be located on the planarization layer 550. In an embodiment, the pixel defining layer 570 may define positions of the organic light emitting diodes OLED.

In an embodiment, the pixel defining layer 570 may expose at least a partial region of the first electrode 511.

In an embodiment, a plurality of openings 571 may exist in the pixel defining layer 570, and the first electrodes 511 of the organic light emitting diodes OLED may be exposed through the openings 571, respectively.

For example, the pixel defining layer 570 may be made of one of organic insulating materials such as acryl-based organic compound, polyamide, and polyimide. However, the present disclosure is not limited thereto, and the pixel defining layer 570 may be formed of various insulating materials.

In an embodiment, as described above, the emitting layer 512 and the second electrode 513 may be sequentially disposed on the first electrode 511.

In an embodiment, the second electrode 513 may extend along the pixel defining layer 570 to be connected to the second electrode 513 of an adjacent organic light emitting diode OLED. In an embodiment, the second electrodes 513 of the organic light emitting diodes OLED may be connected to each other.

As a result, the pixel defining layer 570 may define positions of the organic light emitting diodes OLED through the openings 571 that determine positions of the first electrodes 511.

The encapsulation layer 420 may be located over the organic light emitting diodes OLED. Specifically, the encapsulation layer 420 may be located over the second electrodes 513.

Referring to FIG. 15B, the display device 2 according to the embodiment may further include a buffer layer 590 located on the encapsulation layer 420. In an embodiment, the touch electrodes 110 may be located on the buffer layer 590.

The buffer layer 590 may be disposed to minimize damage of the encapsulation layer 420 and the organic light emitting diode OLED when the touch electrodes 110 are formed.

For example, the buffer layer 590 may include an inorganic insulating material and an organic insulating material. However, the buffer layer 590 may be integrated with the encapsulation layer 420 or be omitted, if necessary.

Referring to FIG. 15C, the driving pad 310 according to the embodiment may include a first conductive pattern 311 and a second conductive pattern 312.

The first conductive patter 311 may be located on the substrate 10, and an insulating layer 421 having a contact hole 422 may be located over the first conductive pattern 311.

The insulating layer 421 may be formed through the same process as the above-described encapsulation layer 420, and have the same structure as the encapsulation layer 420.

The second conductive pattern 312 may be located on the insulating layer 421, and be in contact with the first conductive pattern 311 through the contact hole 422.

For example, the second conductive patter 312 may be electrically connected to the demultiplexer 200a and 200b through a line (not shown) located on the insulating layer 421.

In an embodiment, the connecting member 450 may be attached on the second conductive pattern 312, to perform electrical connection between the driving pad 310 and the touch driving unit 460.

Figure 16A:
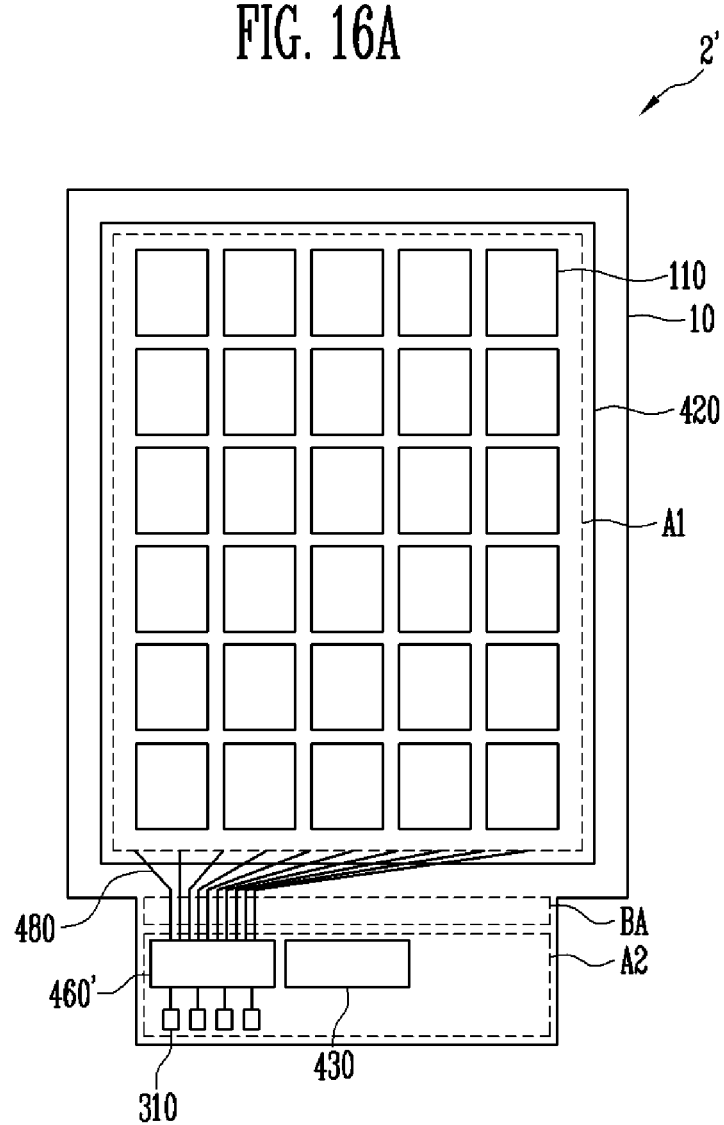
FIG. 16A is a view (e.g., plan view) illustrating a display device according to an embodiment.
Figure 16B:
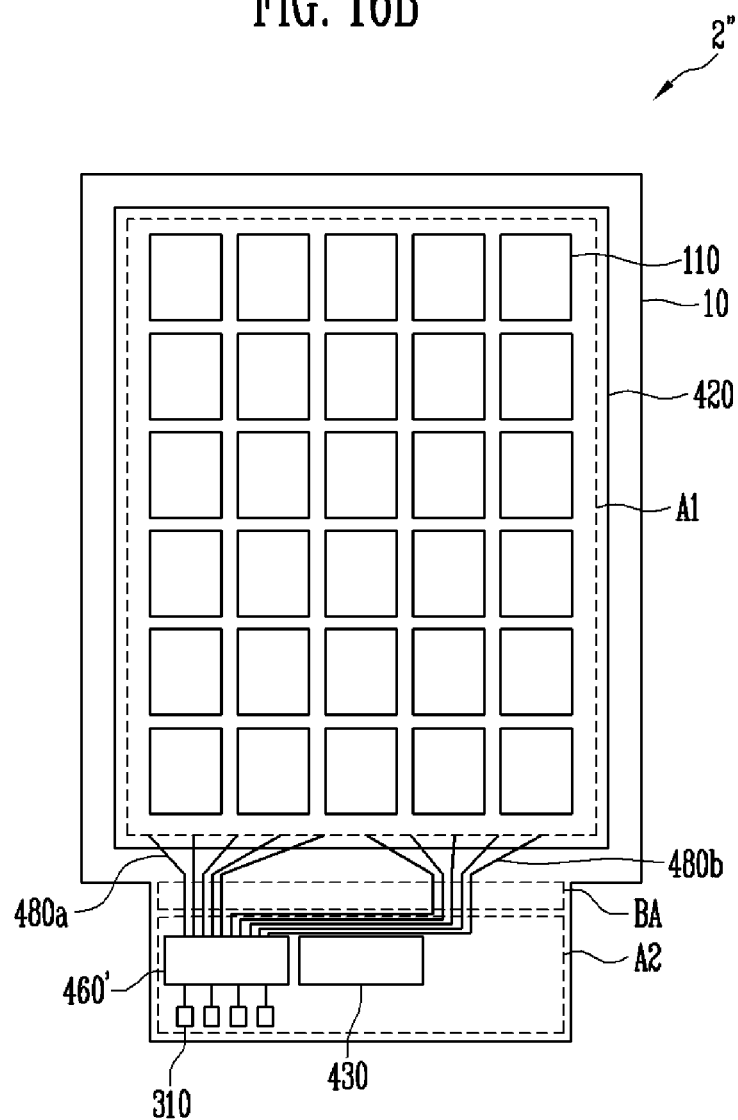
FIG. 16B is a view illustrating a display device according to an embodiment.

FIGS. 16A and 16B are views illustrating display devices according to embodiments.

Referring to FIG. 16A, in a display device 2' according to an embodiment, a touch driving unit 460' may be located on the second region A2 of the substrate 10.

In an embodiment, the touch driving unit 460' may be integrated with the above-described demultiplexer 200 to be implemented in one integrated circuit (IC).

In an embodiment, the driving pads 310 and the demultiplexer 200 built in the touch driving unit 460' may function to supply driving signals Ds to the touch electrodes 110 in a test process before product shipment. However, when the display device 2' is actually used after product completion, the touch driving unit 460' may directly supply the driving signals Ds to the touch electrodes 110 without passing through the demultiplexer 200. Therefore, when the display device 2' is actually used, the operation of the demultiplexer 200 may be stopped.

In an embodiment, driving lines 480 connected to the touch electrodes 110 may be gathered at an upper side of the bending region BA to constitute one group, and be connected to the touch driving unit 460' by crossing the bending region BA.

In an embodiment, the total area of dead spaces can be minimized.

Referring to FIG. 16B, in a display device 2" according to an embodiment, driving lines 480a and 480b connected to the touch electrodes 110 may constitute a plurality of groups.

In an embodiment, some driving lines 480a may be gathered at an upper side of the bending region BA to constitute one group, and be connected to the touch driving unit 460' by crossing the bending region BA.

In an embodiment, other driving lines 480b may be gathered at an upper side of the bending region BA to constitute another group, and be connected to the touch driving unit 460' by crossing the bending region BA and then passing through a path between the bending region BA and the display driver 430.

In an embodiment, the total area of dead spaces can be minimized.

According to embodiments, it is possible to minimize the number of pads in a touch sensor and/or a display device.

Example embodiments have been disclosed. Although specific terms are employed, they are used and are to be interpreted in a generic and descriptive sense and not for purpose of limitation. In some instances, features, characteristics, and/or elements described in connection with a particular embodiment may be used singly or in combination with features, characteristics, and/or elements described in connection with other embodiments unless otherwise specifically indicated. Various changes in form and details may be made to the example embodiments without departing from the spirit and scope as set forth in the following claims.

What is claimed is:

1. A display device comprising:
a substrate;
a pixel array disposed on the substrate and comprising a plurality of pixels;
a touch electrode array disposed on the pixel array and comprising electrode groups each including a plurality of touch electrodes arranged in a first direction;
a first demultiplexer disposed on the substrate and electrically connected to the touch electrode array, the first demultiplexer including sub-demultiplexers electrically connected to the electrode groups;
a driving pad disposed on the substrate; and
a second demultiplexer disposed on the substrate and electrically connected between the first demultiplexer and the driving pad,
wherein the electrode groups comprise a first electrode group and a second electrode group, and the first electrode group and the second electrode group are arranged in the first direction,
wherein the sub-demultiplexers comprise a first sub-demultiplexer and a second sub-demultiplexer, and the first sub-demultiplexer and the second sub-demultiplexer are adjacent to each other in a second direction crossing the first direction, and
wherein the first sub-demultiplexer and the second sub-demultiplexer arranged in the second direction are electrically connected to the first electrode group and the second electrode group arranged in the first direction, respectively.

2. The display device of claim 1, wherein the electrode groups comprise a third electrode group, and the first direction the first electrode group and the third electrode group are arranged in the second direction.

3. The display device of claim 1, wherein:
the pixel array and the touch electrode array are disposed in a first region of the substrate, and
wherein the first demultiplexer, the second demultiplexer, and the driving pad are disposed in a second region of the substrate positioned at a side of the first region.

4. The display device of claim 3, wherein the sub-demultiplexers are adjacent to each other in the second direction intersecting the first direction.

5. The display device of claim 1, wherein:
the electrode groups further comprise, a third electrode group adjacent to the first electrode group in the second direction, and a fourth electrode group adjacent to the second electrode group in the second direction; and
the sub-demultiplexers further comprises a third sub-demultiplexer and a fourth sub-demultiplexer electrically connected to the third and the fourth electrode groups, respectively.

6. The display device of claim 1, further comprising:
a first voltage pad to provide a first voltage; and
a third demultiplexer electrically connected between the touch electrode array and the first voltage pad.

7. The display device of claim 6, wherein the third demultiplexer comprises sub-demultiplexers electrically connected to the electrode groups, respectively.

8. The display device of claim 1, further comprising:
a connecting member electrically connected to the driving pad; and
a touch driver to supply a driving signal to the driving pad through the connecting member.

9. The display device of claim 1,
the first demultiplexer is configured to operate in response to first control signals; and
the second demultiplexer is configured to operate in response to second control signals.

10. The display device of claim 9, further comprising:
first control pads disposed on the substrate and configured to provide the first control signals to the first demultiplexer; and
second control pads disposed on the substrate and configured to provide the second control signals to the second demultiplexer.

11. The display device of claim 1, further comprising an encapsulation layer disposed on the pixel array and comprising an organic layer and an inorganic layer, wherein the touch electrode array is disposed on the encapsulation layer.

12. The display device of claim 1, wherein the plurality of pixels comprises organic light emitting diodes.

13. A display device comprising:
a substrate;
a pixel array disposed on the substrate and comprising a plurality of pixels;
a touch electrode array disposed on the pixel array and comprising electrode groups each including touch electrodes arranged in a first direction;

a first demultiplexer disposed on the substrate and electrically connected to the touch electrode array, the first demultiplexer including sub-demultiplexers electrically connected to the electrode groups;
a driving pad disposed on the substrate; and
a second demultiplexer disposed on the substrate and electrically connected between the first demultiplexer and the driving pad;
a first voltage pad to provide a first voltage;
a third demultiplexer electrically connected between the touch electrode array and the first voltage pad;
a second voltage pad to provide a second voltage different from the first voltage; and
a fourth demultiplexer electrically connected between the touch electrode array and the second voltage pad.

14. The display device of claim 13, wherein the fourth demultiplexer comprises sub-demultiplexers electrically connected to the electrode groups, respectively.

15. The display device of claim 13, further comprising:
a connecting member electrically connected to the driving pad; and
a touch driver to supply a driving signal to the driving pad through the connecting member.

16. The display device of claim 13,
the first demultiplexer is configured to operate in response to first control signals; and
the second demultiplexer is configured to operate in response to second control signals.

17. The display device of claim 13, further comprising an encapsulation layer disposed on the pixel array and comprising an organic layer and an inorganic layer, wherein the touch electrode array is disposed on the encapsulation layer.

18. The display device of claim 13, wherein the plurality of pixels comprises organic light emitting diodes.

* * * * *